United States Patent
Scian et al.

(10) Patent No.: US 8,365,160 B2
(45) Date of Patent: *Jan. 29, 2013

(54) METHOD AND SYSTEM FOR GENERATING A REVERSE BINARY PATCH

(75) Inventors: Anthony F. Scian, Waterloo (CA); John F. A. Dahms, Waterloo (CA)

(73) Assignee: Research In Motion Limited, Waterloo (CA)

( * ) Notice: Subject to any disclaimer, the term of this patent is extended or adjusted under 35 U.S.C. 154(b) by 208 days.

This patent is subject to a terminal disclaimer.

(21) Appl. No.: 12/856,899

(22) Filed: Aug. 16, 2010

(65) Prior Publication Data

US 2010/0306756 A1    Dec. 2, 2010

Related U.S. Application Data

(63) Continuation of application No. 11/426,331, filed on Jun. 26, 2006, now Pat. No. 7,779,401.

(51) Int. Cl.
  *G06F 9/44* (2006.01)
  *G06F 9/45* (2006.01)
(52) U.S. Cl. .......... 717/168; 717/172; 709/203
(58) Field of Classification Search .......... 717/168–174; 709/203–204
See application file for complete search history.

(56) References Cited

U.S. PATENT DOCUMENTS

| | | | |
|---|---|---|---|
| 5,325,532 A * | 6/1994 | Crosswy et al. | 713/2 |
| 5,568,612 A * | 10/1996 | Barrett et al. | 709/203 |
| 5,623,604 A | 4/1997 | Russell et al. | |
| 5,745,906 A | 4/1998 | Squibb | |
| 5,832,520 A | 11/1998 | Miller | |
| 6,009,274 A * | 12/1999 | Fletcher et al. | 717/173 |
| 6,052,531 A | 4/2000 | Waldin, Jr. et al. | |
| 6,161,218 A | 12/2000 | Taylor | |
| 6,167,407 A | 12/2000 | Nachenberg et al. | |
| 6,349,311 B1 | 2/2002 | Sobel et al. | |
| 6,397,385 B1 | 5/2002 | Kravitz | |
| 6,434,744 B1 | 8/2002 | Chamberlain et al. | |
| 6,438,749 B1 | 8/2002 | Chamberlain | |
| 6,526,574 B1 | 2/2003 | Jones | |
| 6,775,423 B2 | 8/2004 | Kulkarni et al. | |

(Continued)

FOREIGN PATENT DOCUMENTS

| | | |
|---|---|---|
| EP | 1191767 | 3/2002 |
| EP | 1855197 | 11/2007 |

(Continued)

OTHER PUBLICATIONS

Li et al, "The design of streaming media proxy server based on patching first algorithm", IEEE, pp. 643-647, 2011.*

(Continued)

*Primary Examiner* — Anil Khatri
(74) *Attorney, Agent, or Firm* — Ridout & Maybee LLP

(57) ABSTRACT

A reverse patch for undoing a forward patch for obtaining a new binary image from an old binary image is generated in two parts. First a reverse index file is generated when the forward patch is created at a host or server. The reverse index file identifies regions of similarity between the old binary image and the new binary image. The reverse index file is transmitted with the forward patch to an electronic device. Second, while applying the forward patch to obtain the new binary image from the old binary image, the electronic device generates the reverse patch based upon the new binary image, the old binary image, and the reverse index file. The forward patch and reverse patch may both be incremental patches. Incremental patches are generated and applied on a sector-by-sector basis.

32 Claims, 14 Drawing Sheets

U.S. PATENT DOCUMENTS

| | | | |
|---|---|---|---|
| 6,832,373 B2* | 12/2004 | O'Neill | 717/171 |
| 6,915,513 B2* | 7/2005 | Duesterwald et al. | 717/168 |
| 6,959,320 B2* | 10/2005 | Shah et al. | 709/203 |
| 7,000,230 B1* | 2/2006 | Murray et al. | 717/172 |
| 7,073,172 B2 | 7/2006 | Chamberlain | |
| 7,080,051 B1 | 7/2006 | Crawford | |
| 7,117,494 B2 | 10/2006 | Rajaram | |
| 7,149,508 B2 | 12/2006 | Herle | |
| 7,389,505 B2* | 6/2008 | Berenberg et al. | 717/172 |
| 7,409,685 B2* | 8/2008 | Chen et al. | 717/170 |
| 7,451,440 B2 | 11/2008 | Zweifel | |
| 7,461,373 B2 | 12/2008 | Herle et al. | |
| 7,492,953 B2 | 2/2009 | Anderson et al. | |
| 7,549,148 B2* | 6/2009 | Cross et al. | 717/174 |
| 7,552,430 B2 | 6/2009 | Napier et al. | |
| 7,784,044 B2* | 8/2010 | Buban et al. | 717/168 |
| 7,805,719 B2* | 9/2010 | O'Neill | 717/168 |
| 7,865,888 B1* | 1/2011 | Qureshi et al. | 717/168 |
| 7,870,550 B1* | 1/2011 | Qureshi et al. | 717/174 |
| 7,890,581 B2* | 2/2011 | Rao et al. | 709/204 |
| 7,971,202 B2* | 6/2011 | Bell et al. | 717/172 |
| 8,055,096 B2* | 11/2011 | Dahms et al. | 382/282 |
| 8,261,256 B1* | 9/2012 | Adler et al. | 717/173 |
| 2002/0034105 A1 | 3/2002 | Kulkarni et al. | |
| 2004/0088694 A1 | 5/2004 | Ho | |
| 2004/0145661 A1 | 7/2004 | Murakami et al. | |
| 2004/0235514 A1 | 11/2004 | Bloch et al. | |
| 2004/0261073 A1 | 12/2004 | Herle et al. | |
| 2006/0112152 A1 | 5/2006 | Napier et al. | |

FOREIGN PATENT DOCUMENTS

| | | |
|---|---|---|
| GB | 2378854 | 2/2003 |
| WO | WO01/61973 | 8/2001 |
| WO | WO02/063576 | 8/2002 |
| WO | WO2004025933 | 3/2004 |
| WO | WO2004/114130 | 12/2004 |
| WO | WO2005/101200 | 10/2005 |

OTHER PUBLICATIONS

Jia et al, "Optimizing kd-trees for scalable visual descriptor indexing", IEEE, pp. 3392-3399, 2010.*

Mohamed et al, "Binary image compression using efficient partitioning into rectangular regions", IEEE, vol. 41, No. 5, pp. 1888-1893, 1995.*

Samanta et al, "Directional line edge binary pattern for texture image indexing and retrieval", ACM ICACCI, pp. 745-750, 2012.*

Sony Ericsson W800i, 2005, Sony Ericsson AB, XP002413530, Retrieved from Internet, URL: http://www.sonyericsson.com/downloads/W8001_UG_AddOn2_R1a_EN.pdf., pp. 80, 81.

C. Percival, An Automated Binary Security Update System for FreeBSD, Proceedings of BSDCon '03, Sep. 2003.

C. Percival, Naive Differences of Executable Code, http://www.daemonology.net/bsdiff/ (2003).

Perkins et al, "Automatically patching erns in deployed software", ACM SOSP, pp. 87-102, 2009.

Nurolahzade et al, "The role of patch review in software evolution: an analysis of the mozilla firefox", ACM IWPSE, pp. 9-17, 2009.

Vojnovic et al, "On the race of worms, alerts and patches", IEEE/ACM Trans. On networking, vol. 16, No. 5, pp. 1066-1079. 2008.

\* cited by examiner

METHOD AND SYSTEM FOR GENERATING A REVERSE BINARY PATCH

RELATED APPLICATION DATA

This application is a continuation of non-provisional U.S. patent application Ser. No. 11/426,331, filed Jun. 26, 2006, which is incorporated herein by reference in its entirety.

FIELD

The present application relates to software patches and, more particularly, to a method and system for generating a reverse patch for undoing a software update.

BACKGROUND

A common practice in the computer software industry is to update binary code by way of a patch. Application of a patch to existing binary code results in updated binary code. In its simplest form, a patch is a set of commands for creating the updated binary code using the existing binary code. For example, the patch may include a set of copy and insert commands. A copy command includes a reference to a section of the existing binary code that matches a section of the updated binary code. The copy command is useful when a portion of the updated binary code can be obtained from the existing binary code. An insert command provides data to be inserted in the updated binary code. The insert command is used to create portions of the updated binary code that cannot be found in the existing binary code.

In practice, the "copy" command in a patch rarely involves copying an exact portion of the existing binary code for inclusion in the updated binary code. Usually, the "copied" portion of the existing binary code is similar, but not exactly the same, as the desired portion of updated binary code. Accordingly, the patch may also include an associated difference file. The copy command is used to indicate that a portion of the updated binary code is similar to the existing binary code, and the associated difference file contains the byte-wise differences. Each copy command may specify an offset in the existing binary code and a length. The specified portion of the existing binary code is read and added to the same number of bytes from the associated difference file to create the desired portion of the updated binary code.

The creation of a patch is typically a two-step process. The first step is to identify the similar regions between a new binary image and an old binary image. This is an indexing step that involves searching through the two images to find regions that are the same or substantially similar. In some cases this indexing operation may be based upon hashing or suffix sorting. These types of operations are very computationally intensive. The indexing operation results in an index file that contains pointers or other information defining the regions of substantial similarity between the new image and the old image. In some instances the index file may be referred to as a similar regions map.

After the indexing operation, a patch generation operation constructs the patch by generating "copy" and "insert" commands based upon the new image, the old image and the similar regions map (i.e. the index file). The result of the patch generation operation is the patch file.

In some instances, it may be desirable to "undo" or rollback a patch, so as to recover the old binary image. One method of doing this is to save a copy of the old image in memory; however, this is impractical on memory-scarce devices, like mobile handheld devices. Another method of undoing a patch is to distribute the patch along with a reverse patch, which can be used by the device to recover the old image from the new image. However, the reverse patch may be a large file which makes the downloading of both the forward patch and the reverse patch a time consuming and possibly expensive operation. A third method is to have the device generate the reverse patch when it applies the forward patch, so as to be able to undo the changes; however, computing a patch is a computationally intensive operation which the device may be unable to practically accomplish given its limited memory and processing power.

It would be advantageous to provide a new method and system for generating a reverse patch.

BRIEF DESCRIPTION OF THE DRAWINGS

Reference will now be made, by way of example, to the accompanying drawings which show example embodiments of the present application, and in which.

Similar reference numerals may have been used in different figures to denote similar components.

DESCRIPTION OF EXAMPLE EMBODIMENTS

Figure 1:
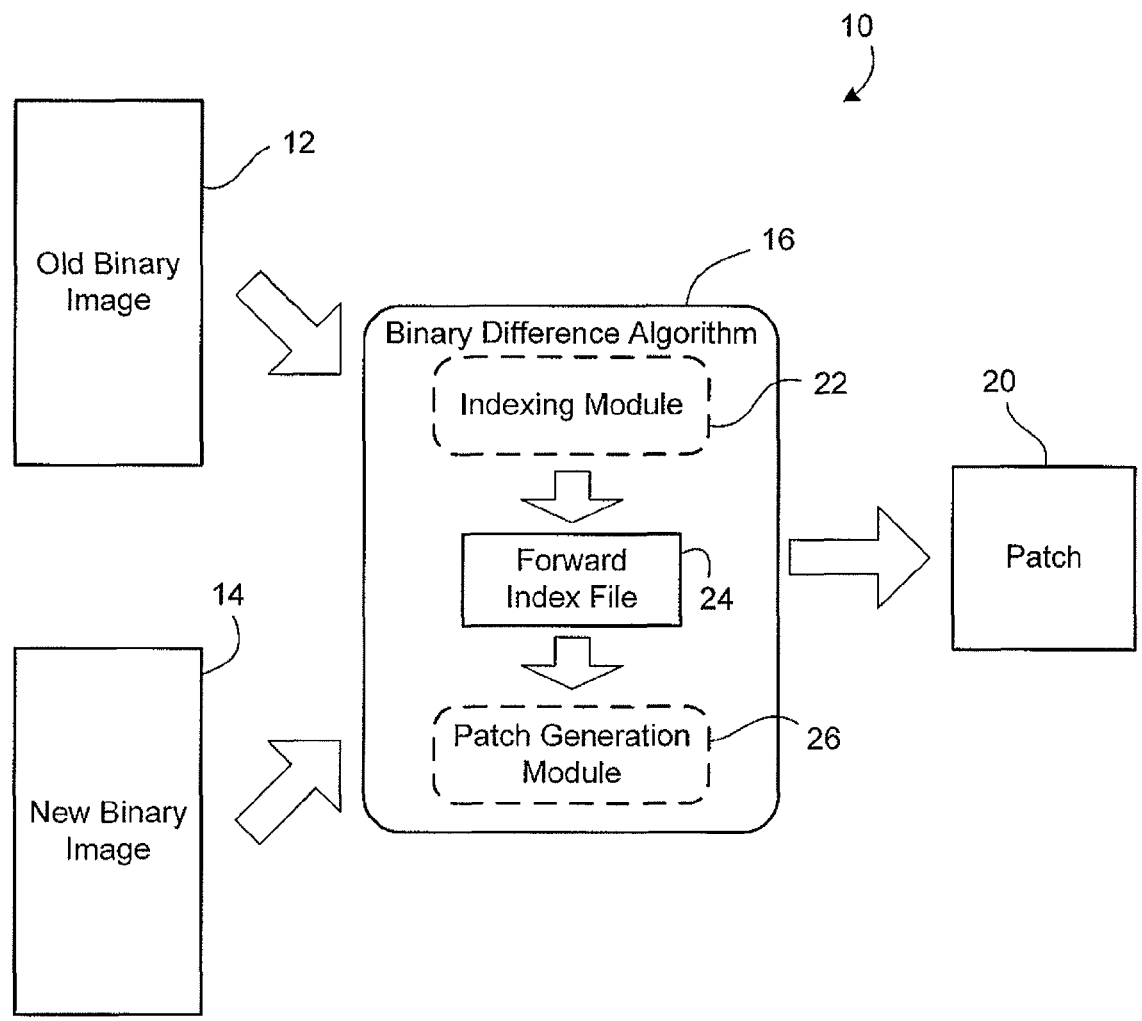
FIG. 1 shows a block diagram of a known method of producing a patch for generating a new binary image from an old binary image.

The present application describes and discloses methods, systems, and machine-readable mediums for generating a reverse patch.

In one aspect, the present application describes a method for generating a reverse patch for reversing a forward patch on an electronic device. The forward patch generates a new binary image from an old binary image. The method includes steps of generating an index file at a server, the index file identifying regions of similarity between the old binary image and the new binary image for use in obtaining at least a portion of the old binary image from the new binary image, transmitting the forward patch and the index file from the server to the electronic device, applying the forward patch to the old binary image to create the new binary image at the electronic device, and generating the reverse patch from the new binary image, the old binary image, and the index file at the electronic device.

In another aspect, the present application describes a method for generating a reverse index file for use in generating a reverse patch for reversing a forward patch on an electronic device. The forward patch generates a new binary image from an old binary image. The method includes the steps of generating an index file at a server, the index file identifying regions of similarity between the old binary image and the new binary image for use in obtaining at least a portion of the old binary image from the new binary image, and transmitting the forward patch and the index file from the server to the electronic device.

In yet another aspect, the present application describes a method for generating a reverse patch for reversing a forward patch on an electronic device. The forward patch generates a new binary image from an old binary image. The method includes steps of receiving the forward patch and an index file from a server, the index file identifying regions of similarity between the old binary image and the new binary image for use in obtaining at least a portion of the old binary image from the new binary image, applying the forward patch to the old binary image to create the new binary image at the electronic device, and generating the reverse patch from the new binary image, the old binary image, and the index file at the electronic device.

In a further aspect, the present application describes a system for generating a reverse patch for reversing a forward patch. The forward patch generates a new binary image from an old binary image. The system includes a server and an electronic device. The server includes a processor and memory for storing the new binary image and the old binary image and for storing the forward patch. The server also includes an indexing module executable by the processor for generating an index file, the index file identifying regions of similarity between the old binary image and the new binary image for use in obtaining at least a portion of the old binary image from the new binary image. The server also includes a communications interface for transmitting the forward patch and the index file from the server to the electronic device. The electronic device includes a device processor and device memory for storing the forward patch and the index file received from the server via one or more communications networks. The electronic device includes a patch manager for applying the forward patch to the old binary image to create the new binary image, and includes a patch generation module for generating the reverse patch from the new binary image, the old binary image, and the index file.

In yet a further aspect, the present application describes a server for generating a reverse index file for use in generating a reverse patch for reversing a forward patch on an electronic device. The forward patch generates a new binary image from an old binary image. The server includes a processor and memory for storing the new binary image and the old binary image, and for storing the forward patch. The server also includes an indexing module executable by the processor for generating an index file, the index file identifying regions of similarity between the old binary image and the new binary image for use in obtaining at least a portion of the old binary image from the new binary image. The server also includes a communications interface for transmitting the forward patch and the index file from the server to the electronic device.

In yet a further aspect, the present application describes an electronic device for generating a reverse patch for reversing a forward patch. The forward patch generates a new binary image from an old binary image. The electronic device includes a device processor, a communications subsystem for receiving the forward patch and the index file from a server via one or more communications networks, and device memory for storing the forward patch and the index file. The electronic device includes a patch manager for applying the forward patch to the old binary image to create the new binary image, and a patch generation module for generating the reverse patch from the new binary image, the old binary image, and the index file.

In yet another aspect, the present application describes machine-readable media for storing computer-executable code for implementing any of the methods described herein.

Embodiments of the present application are not limited to any particular operating system, mobile device architecture, server architecture, or computer programming language.

References in the present application to "blocks" or "sectors" of an image or of memory are intended to refer to portions or blocks of memory space having a predefined size. In the case of flash memory, or other similar types of writable memory, a block or sector refers to that sub-portion of the memory that can be written at one time.

While the present application describes embodiments that are of use in patching code resident in flash memory, the present application is not limited to patching binary data in flash memory and may be implemented in connection with other types of memory. It will also be understood that, although the present application provides some examples of methods for choosing the permutation of sectors to use in generating the incremental patches, the present application is not limited to these methods.

Patching Binary Images

Reference is first made to FIG. 1, which shows a block diagram of a known method 10 of producing a patch for generating a new binary image 14 from an old binary image 12. This patch will be referred to as a forward patch 20, since it is used to obtain the new binary image 14 from the old binary image 14. A binary difference algorithm 16 is used to produce the forward patch 20 based upon the old binary image 12. The forward patch 20 is a difference file that describes how to obtain the new binary image 14 from the old binary image 12. The difference file may reference portions of the old binary image 12 for inclusion in the new binary image 14. It may also include new binary data for inclusion in the new binary image 14, where corresponding data cannot be efficiently referenced from the old binary image 14. In some embodiments, the forward patch 20 may include a set of copy and insert commands, wherein the copy commands reference portions of the old binary image to be copied into the new binary image, and the insert commands contain new data for insertion into the new binary image.

Updating binary images, and in particular executable software code, using a patch is a well-known technique in the computer programming industry. A variety of binary difference algorithms exist and would be well known to those of ordinary skill in that art.

As depicted in FIG. 1, the binary difference algorithm 16 may include an indexing module 22 for comparing the old binary image 12 to the new binary image 14 and identifying regions of similarity. The indexing module 22 may employ hashing, suffix sorting, or any other method of identifying regions of similarity between the old binary image 12 and the new binary image 14. Suitable algorithms or modules for identifying regions of substantial similarity will be appreciated by those of ordinary skill in the art.

The indexing module 22 produces a forward index file 24, which contains data identifying the regions of similarity. In some instances, the forward index file 24 may be referred to as a similar regions map. The forward index file 24 specifies the regions of similarity between the old binary image 12 and the new binary image 14. It may contain offsets or pointers to locations within each image 12 and 14 and lengths of the regions of similarity at those locations.

The forward index file 24 is used, in conjunction with the old binary image 12 and the new binary image 14, by a patch generation module 26 to generate the forward patch 20. The patch generation module 26 creates the copy and insert commands that make up a control file or control region of the forward patch 20. The patch generation module 26 relies upon the forward index file 24 to locate the regions of similarity for generating the copy commands and the associated bytewise difference files.

Once the forward patch 20 has been generated then it may be distributed for use in updating old binary code. In one example, the forward patch 20 is distributed over wired and wireless networks to mobile electronic devices for use in updating the old binary image 12 resident on each of the mobile electronic devices. Each device receives the forward patch 20 and uses it to generate the new binary image 14.

Reverse Patches

At times, a device user may wish to undo or roll-back a patch operation. In other words, the user may wish to recover the old binary image 12. In this situation, a reverse binary patch may be used to generate the old binary image 12 from the new binary image 14, thereby undoing the effect of the forward patch 20.

The conventional method of generating and distributing a reverse patch is to create the reverse patch at the same time as the forward patch 20 is generated. The forward patch 20 and reverse patch are then distributed together. As outlined above, transmitting both patches from a host server to a remote client device, especially a wireless device, may be time consuming and costly in terms of bandwidth.

Figure 2:
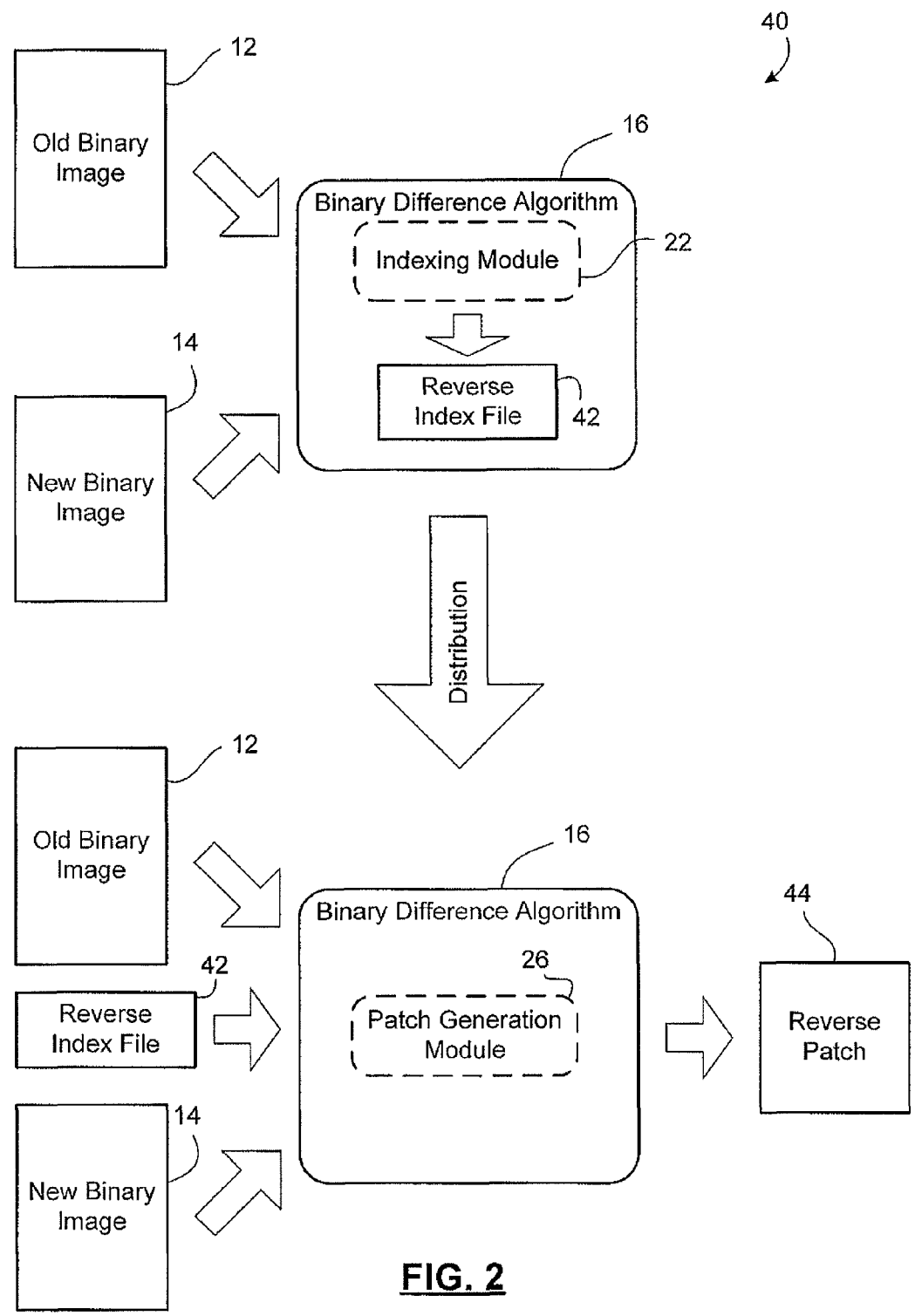
FIG. 2 shows a block diagram of a method of producing a reverse patch for generating the old binary image from the new binary image.

Reference is now made to FIG. 2, which shows a block diagram of a method 40 of producing a reverse patch 44 for generating the old binary image 12 from the new binary image 14. The method 40 begins by using the binary difference algorithm 16 and, in particular, the indexing module 22 to generate a reverse index file 42. Just like the forward index file 24 used in creating the forward patch 20 (FIG. 1), the reverse index file 42 specifies the regions of similarity between the new binary image 14 and the old binary image 12. It may contain offsets or pointers to locations within each image 12 and 14 and lengths of the regions of similarity at those locations. The reverse index file 42 details the regions of the new binary image 14 that are substantially similar to regions within the old binary image 12. In some embodiments, the reverse index file 42 may identify the same similar regions as the forward index file 24, but not necessarily.

The reverse index file 42 is relatively small compared to either the forward patch 20 or the reverse patch 44, since each patch 20, 44 contains data to be inserted into the image it creates. Accordingly, the method 40 includes a step of distributing the reverse index file 42 from the server or host device that created the reverse index file 42 to one or more client devices. In particular, the method 40 includes distributing the reverse index file 42 together with the forward patch 20.

At the client device, application of the forward patch 20 will mean that the device has both the old binary image 12 and the new binary image 14 available to it. The device may therefore finish applying the binary difference algorithm 16 to create the reverse patch 44. In particular, the device employs the patch generation module 26 with the old binary image 12, the new binary image 14, and the reverse index file 42 as inputs to generate the reverse patch 44. The device may then store the reverse patch 44 for later use if it becomes necessary to roll back the patch to recover the old binary image 12.

By distributing the reverse index file 42 instead of the reverse patch 44, the method 40 allows for a faster more efficient download to the device. The method 40 also avoids burdening the device with the computationally intensive task of generating the reverse index file 42 using an indexing operation. Once it has been provided with the reverse index file 42, the device need only perform the patch generation process, which is less computationally demanding.

Figure 3:
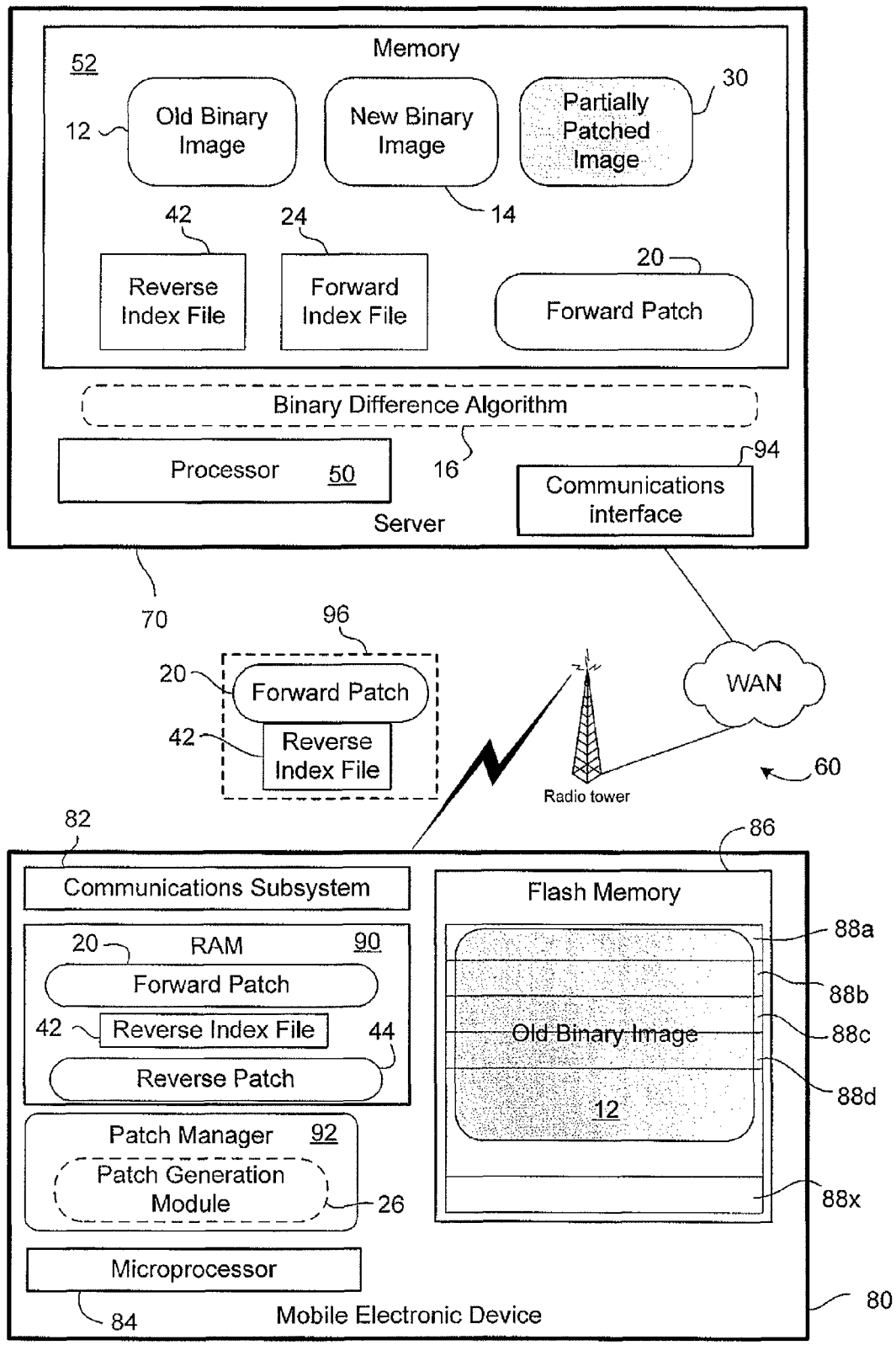
FIG. 3 shows, in block diagram form, a host and a mobile electronic device for generating the reverse patch.

Reference is now made to FIG. 3, which shows, in block diagram form, a host 70 and a mobile electronic device 80 for generating the reverse patch 44.

The host 70 may include a processor 50 and memory 52. The host 70 may, in some embodiments, include a server or gateway or other remote computing device. The memory 52 may store a copy of the old binary image 12 and the new binary image 14. The host 70 includes a binary difference algorithm 16 for generating the forward patch 20. The binary difference algorithm 16 may include the indexing module 22 (FIG. 1) and patch generation module 26 (FIG. 1) as described above in connection with FIG. 1. In some embodiments in which the forward patch 20 is an incremental patch, the memory 52 may further store a partially patched image 30 used by the binary difference algorithm 16 in the course of generating the forward patch 20. The concepts of incremental patching and the partially patched image 30 are explained further below.

In the course of generating the forward patch 20, the indexing module 22 (FIG. 1) of the binary difference algorithm 16 generates the forward index file 24, which is shown as being stored in the memory 52. The host 70 also uses the indexing module 22 to generate the reverse index file 42, which identifies regions of substantial similarity between the old binary file 12 and the new binary file 14.

The host 70 may include a number of other components, both of software and hardware, including an operating system and user interface, as will be appreciated by persons of ordinary skill in the art. The host 70 includes a communications interface 94 to enable the host 70 to send or receive data with remote computers or devices over one or more communications network. The communications interface 94 implements network and communications protocols and may, in one embodiment, package and packetize data payloads for transmission in accordance with a predefined packet communications protocol.

In one embodiment, the host 70 packages the forward patch 20 and the reverse index file 24 together as a deliverable 96. The deliverable 96 may comprise the payload of a packetized message formatted in accordance with a predefined communications protocol, having suitable header or envelope information. The deliverable 96 may be distributed by the host 70 to a plurality of remote devices through one or more communications networks.

The mobile electronic device 80 may include a microprocessor 84, flash memory 86, RAM 90, and a communications subsystem 82. The communications subsystem 82, operating under program control executed by the microprocessor 84, may provide the device 80 with wireless connectivity using known wireless protocols. The communications subsystem 82 may allow the device 80 to communicate with servers and other devices over a wireless network 60, and may provide the device 80 with the ability to receive communications from remote servers, such as the host 70. In some embodiments, the host 70 may transmit or forward files, such as the deliverable 96 to the device 80 via the wireless network 60. The wireless network 60 may include a plurality of wireless transceivers networked through a wide area network, and may include connections with a plurality of other networks, both public and private, including the Internet.

The mobile electronic device 80 further includes a patch manager 92. The patch manager 92 includes computer-readable code executable by the microprocessor 84 for updating a binary image using the forward patch 20. The patch manager 92 may, in some embodiments, be provided as a part of the deliverable 96, although for ease of illustration it is shown as being separate in FIG. 3. The patch manager 92 may be received by the device 80 from the host 70 via the wireless network 60. In another embodiment, the patch manager 92 may be a resident module on the device 80. In some embodiments, the patch manager 92 may be implemented as a part of the device operating system (not shown). In any case, the patch manager 92 implements the commands of the forward patch 20 for updating the binary image stored in flash memory 86, i.e. for obtaining the new binary image 14 from the old binary image 12.

The patch manager 92 further includes the patch generation module 26 for generating patches based upon input images and index files. Accordingly, the device 80 is capable of generating the reverse patch 44 based upon the old binary image 12 (which is resident on the device), the new binary image 14 (which is created through application of the forward patch 20), and the reverse index file 42.

In one embodiment, the device 80 maintains a copy of the old binary image 12 in RAM memory 90 or flash memory 86 following application of the forward patch 20. Application of the forward patch 20 results in generation of the new binary image 14, which is stored in flash memory 86. Accordingly, the old binary image 12, the new binary image 14, and the reverse index file 42 are all available to the patch generation module 26 for generation of the reverse patch 44.

Once the device 80 has generated the reverse patch 44, it may store the reverse patch 44 in non-volatile memory, such as flash memory 86. The old binary image 12 may then be deleted from memory 90 or 86.

Incremental Patches

In some cases, patches are used to update a large block of executable code. For example, the patch may be intended to update the executable code resident on a mobile electronic device, such as a personal digital assistant (PDA). One of the conventional methods of using a patch involves creating a backup copy of the old binary image, generating the new binary image by applying the patch to the old binary image, and then replacing the old binary image with the new binary image. It will be appreciated that this process may require a large amount of memory to implement. For example, if the old binary image is 3 MB, then the backup of this image necessitates a further 3 MB, and the generation of the new image necessitates the availability of about 3 MB. In all, 6-7 MB of free memory space may be necessary to facilitate use of the patch. This amount of free memory may not be available on a memory-scarce device, like a PDA.

Another issue that arises with respect to patching a binary image stored in flash memory is the fact that flash memory can only be written in defined blocks or sectors of a predetermined size.

U.S. Pat. No. 6,775,423 to Kulkarni et al, issued Aug. 10, 2004, describes a binary difference algorithm that attempts to create a patch designed to incrementally update an image stored in flash memory a block at a time. Kulkarni et al. recognizes that portions of the patch may rely upon portions of the old image that are written over as the incremental patching is performed, which results in a cyclic dependency. The Kulkarni patent attempts to address this problem by proposing that portions of the patch be reorganized in order to eliminate cyclic dependencies.

Figure 4:
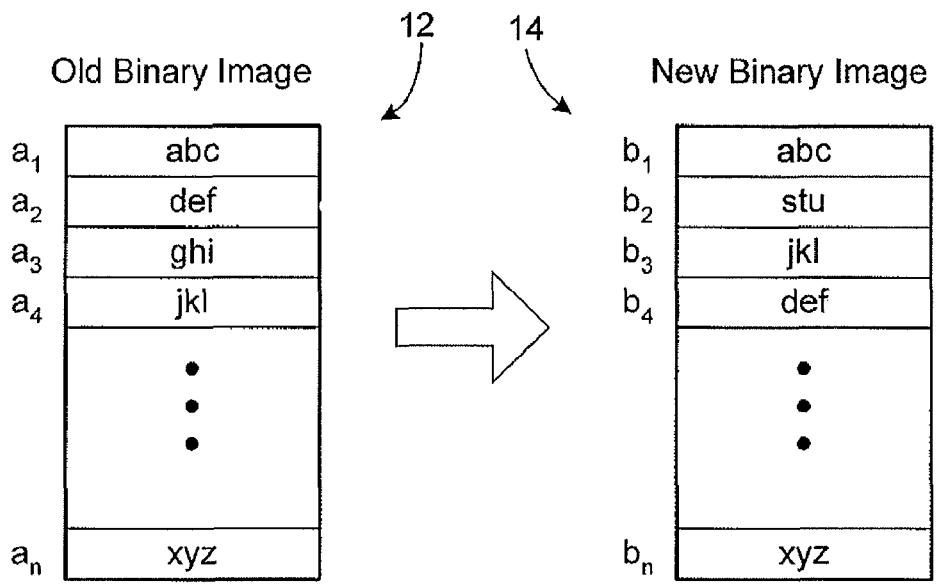
FIG. 4 diagrammatically shows the old binary image and the new binary image.

Reference is now made to FIG. 4, which diagrammatically shows the old binary image 12 and the new binary image 14. The old binary image 12 is contained in n sectors labeled individually $a_1$ to $a_n$. Sector $a_1$, for example, contains binary data "abc". The new binary image 14 is contained in n sectors labeled individually $b_1$ to $b_n$. Sector $b_1$, for example, also contains binary data "abc".

In this embodiment, the old binary image 12 and the new binary image 14 occupy the same n number of sectors; however, in many embodiments the new binary image 14 may occupy more sectors than the old binary image 12. In some embodiments, where the old binary image 12 occupies fewer sectors (i.e. m sectors) than the new binary image 14, then the shorter image may be padded with (n−m) uninitialized sectors so that both images have n sectors. Those skilled in the art will appreciate that the padding of the shorter image (with 00's or ff's) will not materially affect the operation of the methods described herein. In cases where the old binary image 12 occupies more sectors than the new binary image 14, the extra sectors will be used as input for the incremental patches but they will not necessarily be patched to form part of the new image. The removal of these extra sectors can be deduced by the patch method once the patching of the new image is finished.

A forward patch for generating the new binary image 14 from the old binary image 12 may contain references to portions of the old binary image 12 and sections of new data. In other words, the forward patch may contain copy commands that reference portions of the old binary image 12 and insert commands for inserting new data. As noted above, a patch operation performed on code stored in flash memory may be executed on a sector-by-sector basis. Referring still to FIG. 4 as an example, a forward patch may include a command to create sector $b_1$ by copying sector $a_1$ since sector $a_1$ contains the same data, "abc", as sector $b_1$. Similarly, the forward patch may include a command to copy sector $a_2$ in order to create sector $b_4$, since it contains data "def". Sector $b_2$ contains new data that cannot be obtained from the old binary image 12, so the forward patch may contain an insert command and the data "stu".

The order in which sector-specific patches are applied can raise a problem. This problem will now be illustrated by way of a simplified example. When patching a binary image in flash memory, especially on a device with limited memory capacity, like a mobile electronic device, the forward patch may be applied by overwriting the memory sectors containing the old binary image 12 with data to create the new binary image 14. Referring to the example shown in FIG. 4, when the forward patch is applied in order to update the old binary image 12 the forward patch may begin by writing sector $b_1$ with data "abc" based on the reference to sector $a_1$. It may then write sector $b_2$ with the data "stu". Sector $b_3$ may then be written with the data "jkl" based on a reference to sector $a_4$. It will be noted that a cyclic dependency problem may be encountered in attempting to patch sector $b_4$ since it depends on a reference to sector $a_2$ in order to obtain the data "def". However, the data in sector $a_2$ was overwritten with the data "stu" in a previous step in the patch operation. Accordingly, the referenced data in the old binary image 12 is no longer available. The forward patch would therefore need to contain the data "def", which may result in a larger patch.

Figure 5A:
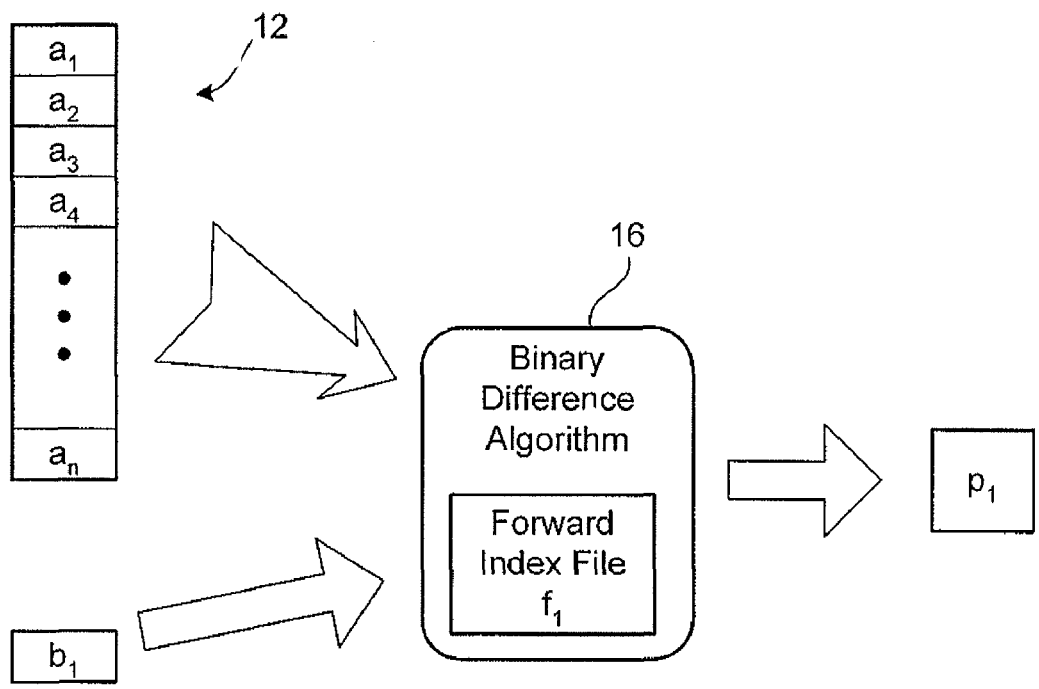
FIGS. 5A-5D illustrate, in block diagram form, the generation of an incremental patch.

Reference is now made to FIGS. 5A-5D, which illustrate, in block diagram form, the generation of an incremental patch in accordance with an embodiment of the present application. FIG. 5A shows the generation of a first patch $p_1$ using the binary difference algorithm 16. The binary difference algorithm 16 generates the first patch $p_1$ based upon the old binary image 12 and a first sector $b_1$ of a new binary image. The first patch $p_1$ contains the instructions for obtaining $b_1$ from the old binary image 12. Accordingly, the first patch $p_1$ may contain copy commands that reference portions of the old binary image 12 and may contain insert commands for inserting new data. It will be appreciated that the application of the binary difference algorithm 16 includes performing an indexing operation to produce a forward index file $f_1$. The forward index file $f_1$ is then used together with the old binary image 12 and the first sector $b_1$ to generate the first patch $p_1$. The forward index file $f_1$ identifies regions of similarity between the old binary image 12 and the first sector $b_1$.

Figure 5B:
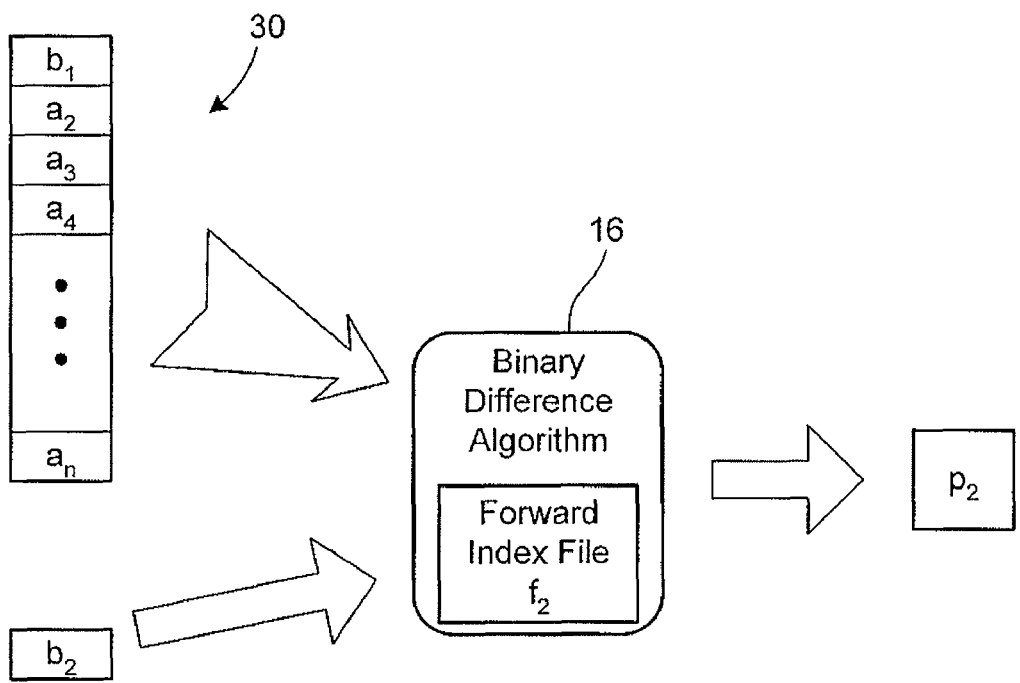

Reference is now made to FIG. 5B, which shows the generation of a second patch $p_2$ using the binary difference algorithm 16. The second patch $p_2$ is generated based upon a second sector $b_2$ of the new binary image and a partially patched image 30. The partially patched image 30 is the old binary image 12 with the previously generated patches applied to it, which in this case includes only the first patch $p_1$. The partially patched image 30 may be referred to as a "current image" or an "intermediate image". The second patch $p_2$ contains instructions for obtaining the second sector $b_2$ of the new binary image from the partially patched image 30.

The application of the binary difference algorithm 16 includes an indexing operation to produce forward index file $f_2$. The forward index file $f_2$ identifies regions of similarity between the partially patched image 30 and the second sector $b_2$.

Figure 5C:
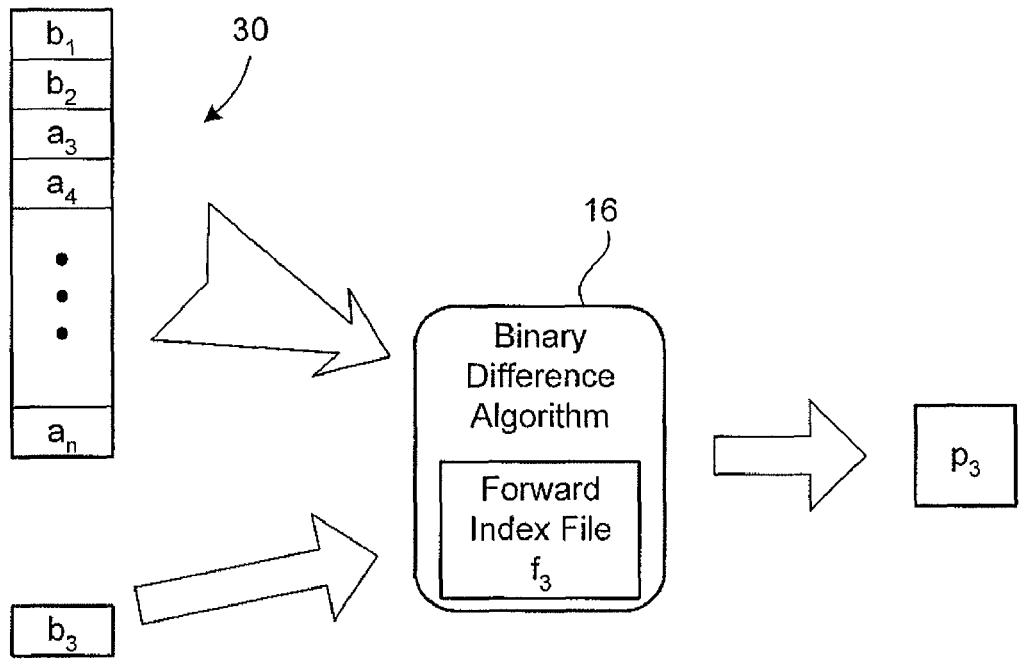

FIG. 5C shows the generation of a third patch $p_3$ using the binary difference algorithm 16. The third patch $p_3$ contains instructions for obtaining a third sector $b_3$ of the new binary image from the partially patched image 30. It will be noted that, at this stage, the partially patched image 30 is obtained from the application of the first patch $p_1$ and the second patch $p_2$ to the old binary image 12. Accordingly, it contains sectors $b_1$ and $b_2$ of the new binary image. Forward index file $f_3$ identifies regions of similarity between the partially patched image 30 and the third sector $b_3$.

Figure 5D:
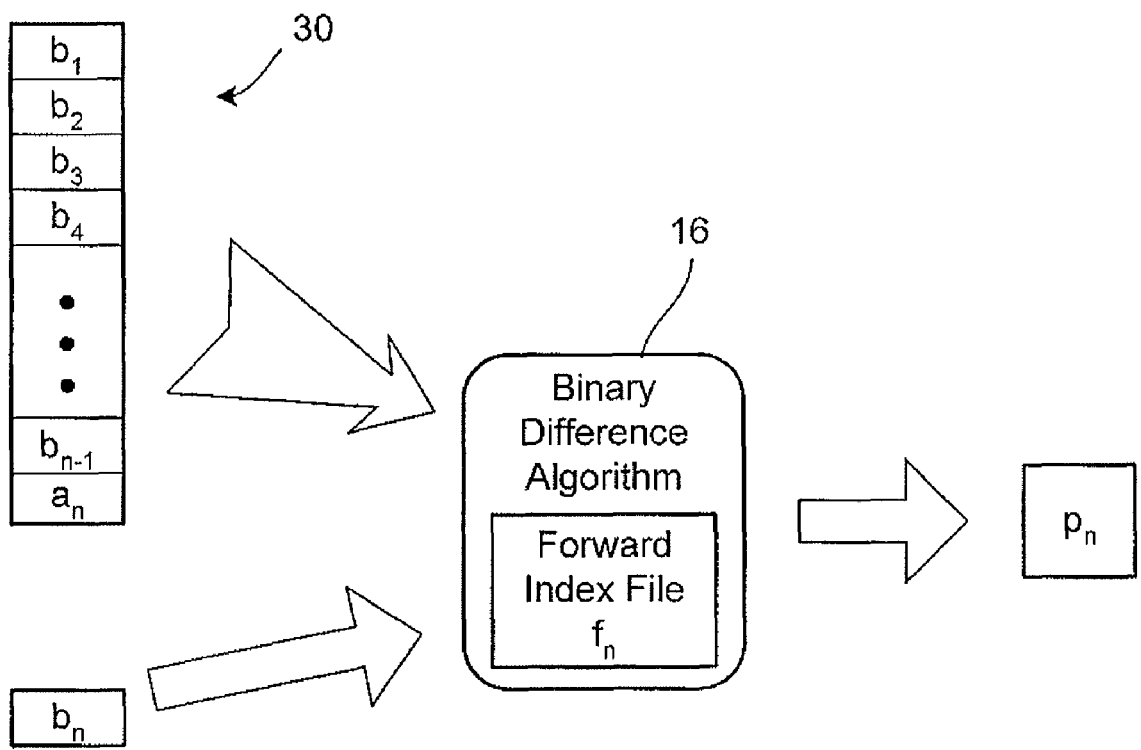

Finally, FIG. 5D shows the generation of the final patch $p_n$ using the binary difference algorithm 16. At this stage the partially patched image 30 includes sectors $b_1$ to $b_{n-1}$ of new binary image data. The final forward index file $f_n$ identifies regions of similarity between the partially patched image 30 and sector $b_n$.

The incremental patch comprises the patches $p_1$ to $p_n$. In some cases, the individual sector-based patches $p_1$ to $p_n$ may be referred to as "delta files". It will be appreciated that each sector-specific patch in the series of patches relies upon the then-current partially patched image 30 instead of the original old binary image 12.

Figure 6:
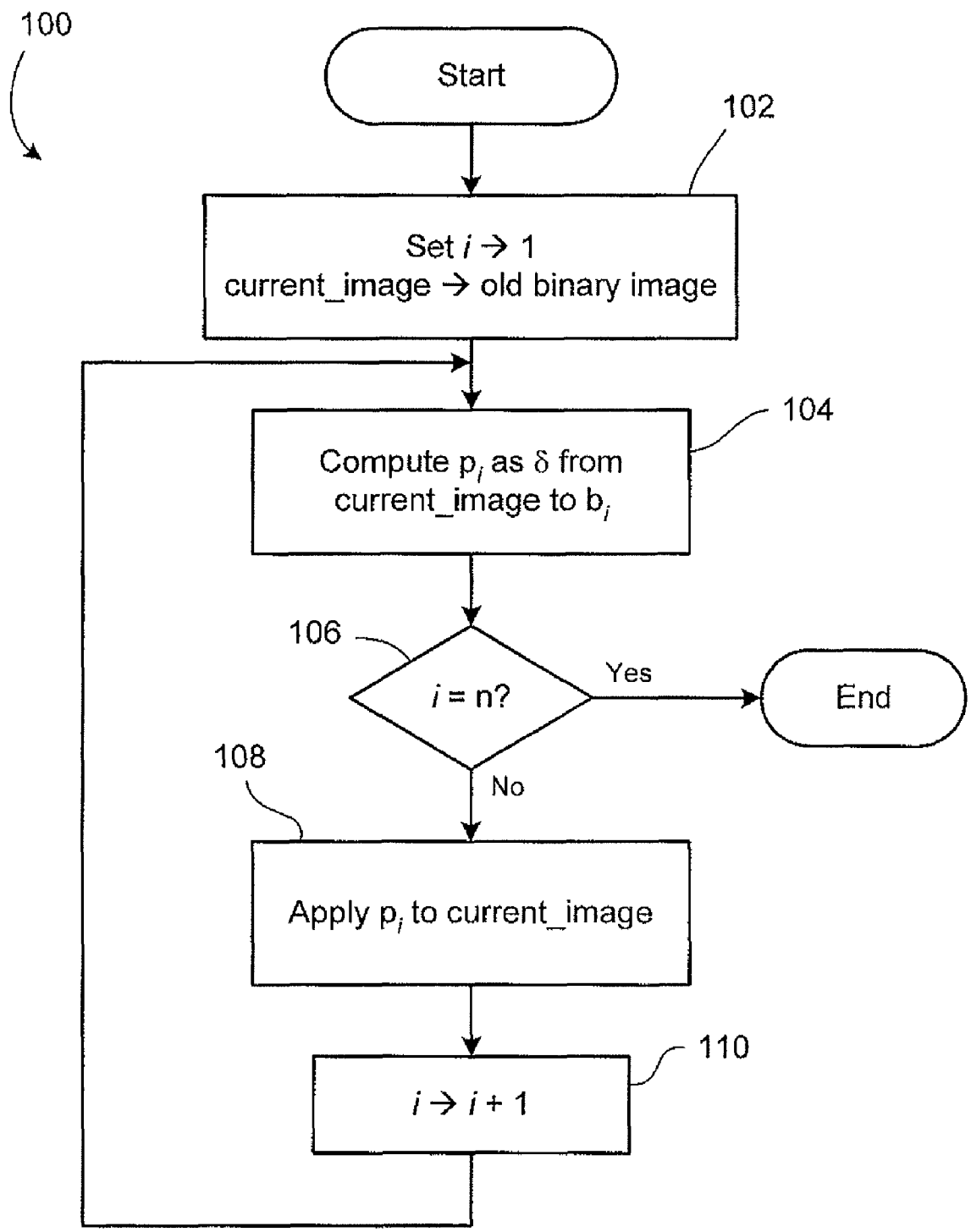
FIG. 6 shows, in flowchart form, a method for generating an incremental patch for updating an old binary image to a new binary image.

Reference is now made to FIG. 6, which shows, in flowchart form, a method 100 for generating an incremental patch for updating an old binary image to a new binary image. The method 100 begins in step 102 by setting an index i to 1. The label current_image refers to the state of the image in flash memory, i.e. the partially patched image, at any given point in time. When the method 100 begins the image in memory is the old binary image, i.e. current_image is the old binary image.

In step 104, a delta file $\delta$ is computed from the current_image and sector $b_i$ of the new binary image. The delta file $\delta$ is the sector-specific patch $p_i$ used to obtain sector $b_i$ from the current_image. The delta file $\delta$ may be obtained by way of applying a suitable binary difference algorithm. The various binary difference algorithms available will be understood by those of ordinary skill in the art.

In step 106, the index i is checked to determine if the last sector $b_n$ of the new image has been reached. If index i equals n, then the method 100 ends since the full set of sector-based patches $p_1$-$p_n$, i.e. the full incremental patch, has been computed. Otherwise, the method 100 continues at step 108.

In step 108, the sector-specific patch $p_i$ computed in step 104 is applied to the current_image, such that the current_image now reflects the incremental implementation of all patches from $p_1$ to $p_i$. In one embodiment, the newly created patch $p_i$ is used to generate sector $b_i$ which is then written to memory over the current_image. This updated current_image will be used in the next iteration of step 104 to generate the next sector-specific patch. The index i is then incremented in step 110 and the method 100 returns to step 104 to generate the next delta file $\delta$.

The embodiment described above in connection with FIGS. 5A-5D and FIG. 6 generates the sector-specific patches $p_i$ in sequential order beginning with index i=1; however, it will be appreciated that the sector-specific patches $p_i$ may be created in a different order in other embodiments. In some cases, the sequential generation of incremental sector-specific patches $p_i$ beginning with the first sector and going to the nth sector may involve the overwriting of data that would have proven useful in performing sector-specific patches later in the sequence. Accordingly, in one embodiment, the sequence may begin with index i=n and move in decrements to index i=1. In yet another embodiment, the sector-specific patches $p_i$ may be created in any order instead of sequentially.

Figure 7:
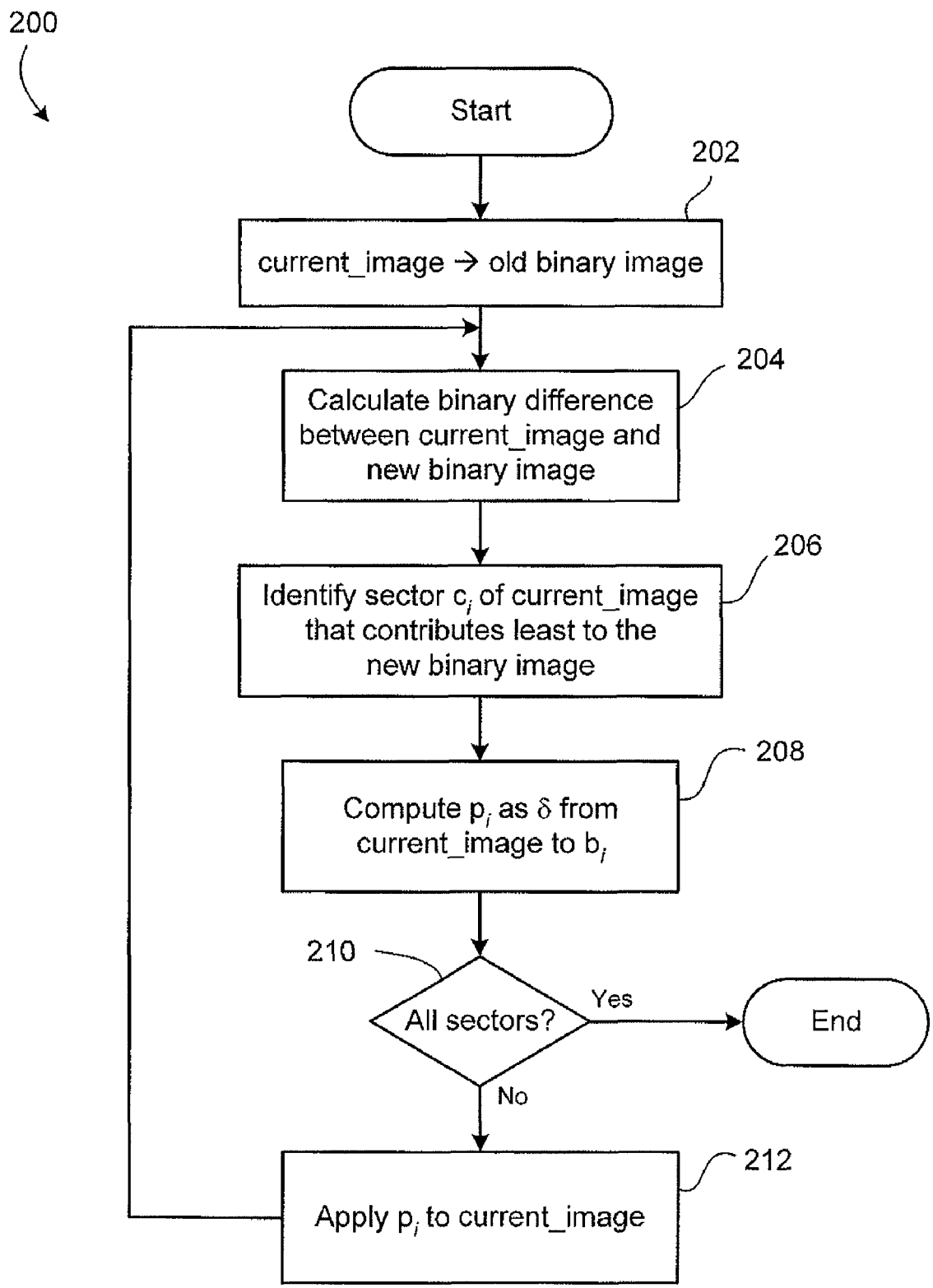
FIG. 7 shows, in flowchart form, another method of generating an incremental patch for updating an old binary image to a new binary image.

In one embodiment, the sector-specific patches $p_i$ may be created in a "least-damage" order. Reference is made to FIG. 7, which shows, in flowchart form, another method 200 of generating an incremental patch for updating an old binary image to a new binary image.

The method 200 begins in step 202. The current_image at this stage of the method 200 is the old binary image. At step 204, a binary difference is calculated between the current_image and the new binary image. The binary difference between the two images may be calculated using a binary difference algorithm in a manner that will be understood by those of ordinary skill in the art.

At step 206, the results of step 204 are used to determine which sector $c_i$ of the current_image contributes the least to creating the new binary image. For example, in one embodiment, the sector $c_i$ of "least damage" may be identified as the sector having the fewest memory locations referenced in the binary difference file generated in step 204. In other words the sector $c_i$ contributes the least amount of data to the new binary image. A sector that contains no data that is referenced in the binary difference file is a sector of "least damage" since it may be wholly overwritten without losing any later referencing opportunities in performing an incremental patch. To the extent that some referencing opportunities are to be sacrificed by overwriting a portion of the current_image, step 206 attempts to identify the sector $c_i$ whose overwriting will result in the lowest quantity of lost data for referencing opportunities.

As the method 200 moves through iterations, step 204 is reassessed with the current_image, meaning that any sector-specific patches $p_i$ generated in previous iterations have been applied, such that those sectors c of the current_image match the corresponding sectors b of new binary image data. In one embodiment, sectors that have been completed in previous iterations may be explicitly excluded from the "least damage" assessment performed in step 206. In another embodiment, the method 200 may not explicitly exclude these completed sectors from the assessment since they will not be identified as "least damage" sectors due to the fact that they perfectly match the corresponding sectors in the new binary image and therefore appear highly relevant in the binary differencing operation of step 204.

It will be appreciated that any permutation of the sectors can be used to produce a series of patches by using the then-current partially patched image at each step. The choice of sector order does not materially affect the operation of the methods described in the present application. It will also be appreciated that in some instances the sector order that produces the minimal overall patch size may be impractical to find because the search belongs to the set of NP-complete problems. This impracticality is further compounded because each permutation requires a time consuming analysis to produce each incremental patch.

In one embodiment, the patch may be generated by way of a method that is the reverse analogue of the method 200 (FIG. 7). In this embodiment, the sector with the highest contribution is used to generate the "last" incremental patch working backwards to generate the "first" incremental patch.

In yet another embodiment, the patch may be generated by way of a method that starts with a random permutation of sectors. In this embodiment, the method makes changes to the permutation, and keeps the changes that make the total size of patches smaller in size. In one embodiment, this method may employ "simulated annealing" techniques. Simulated annealing starts with large changes to the sequence and progresses to smaller changes until no improvement can be found. Those of ordinary skill in the art will be familiar with the concept of "simulated annealing" for locating good approximations to a global optimum of a given function in a large search space.

Figure 8:
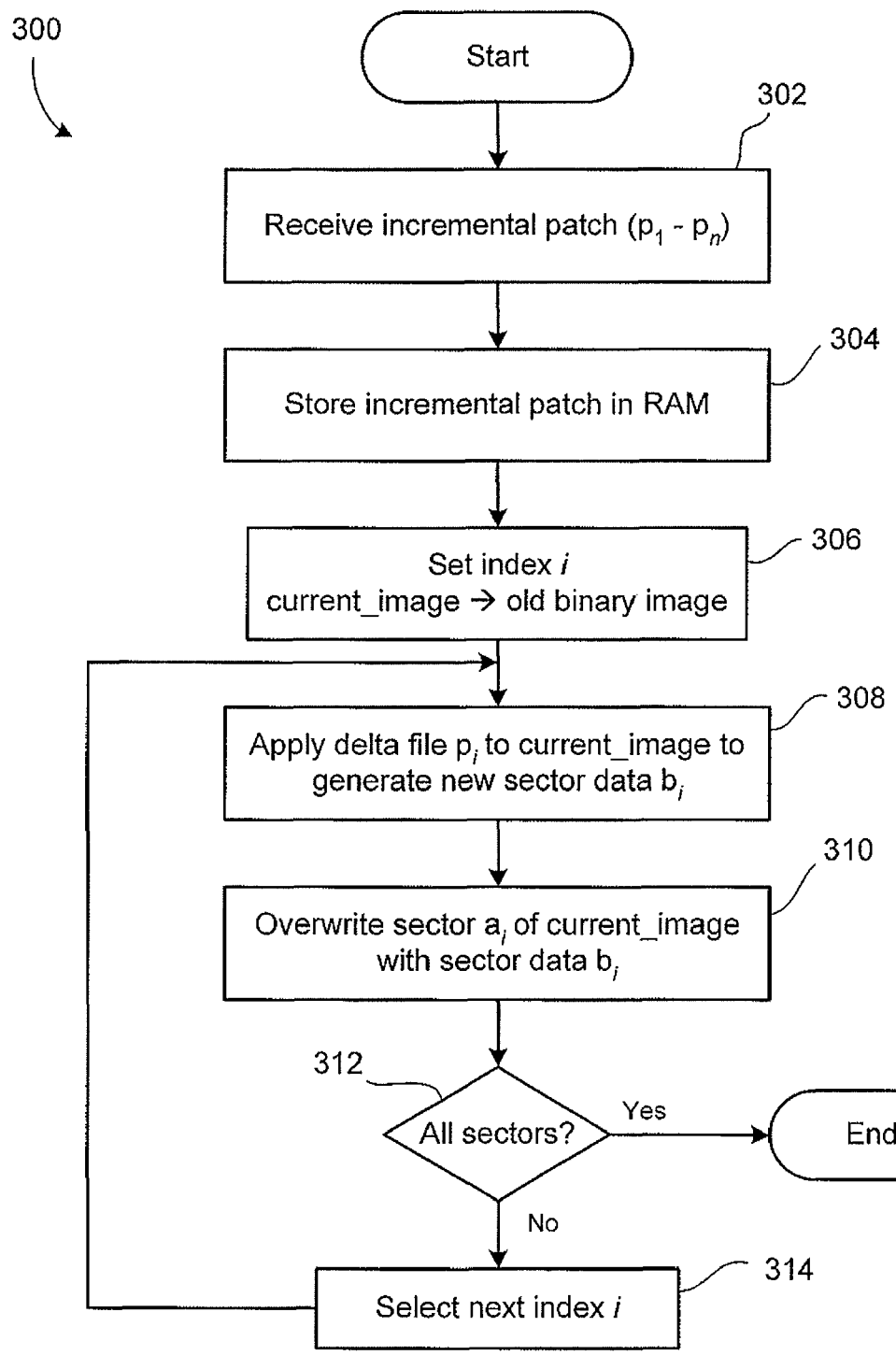
FIG. 8 shows, in flowchart form, a method of incrementally patching a binary image.

Reference is now made to FIG. 8, which shows, in flowchart form, a method 300 of incrementally patching a binary image. The method 300 may be implemented by way of computer program code executable on a processing device. In at least one embodiment, the method 300 is implemented within a mobile electronic device having a flash memory.

The method 300 begins in step 302 with receipt of the incremental patch. In an embodiment involving a mobile electronic device, the incremental patch may be received via wireless communication from a wireless network. In other embodiments, it may be received through a wired connection from a remote source.

The incremental patch is stored in temporary memory in step 304. In one embodiment, the incremental patch may be stored in RAM memory resident on the mobile electronic device.

In step 306, the index i is set to a starting value. The starting value may be specified by the incremental patch. In an embodiment where the patch is intended to be applied sequentially beginning with the first sector of the image and proceeding to the nth sector, the index i may initially be set to 1. However, as noted above, the patch may be intended to be applied to sectors in other orders. The incremental patch may specify an indexing pattern that indicates the order in which the sectors are to be updated using the patch. Accordingly, the indexing pattern may indicate the starting value for the index i.

The label current_image refers to the state of the binary image, e.g. in flash memory, that is being updated by way of the incremental patch. The current_image may also be referred to as the partially patched image. In step 306, the current_image is the old binary image.

In step 308, delta file $p_i$ from the incremental patch, together with the current_image, is used to generate the data for sector $b_i$. In step 310, the data for sector $b_i$ is written over the old data of sector $a_i$. At step 312, the device assesses whether all sectors of the new binary image have been completed and, if so, then the method 300 ends. Otherwise, the method continues in step 314.

In step 314, the next index i is selected. As noted above, the selection of the next index i may be made in accordance with an indexing pattern specified in the incremental patch. The method 300 then returns to step 308 to repeat steps 308 and 310 with the next index i.

Reference is again made to FIG. 3, which shows, in block diagram form, the host 70 and the mobile electronic device 80. In one embodiment, the forward patch 20 is an incremental patch.

The flash memory 86 is divided into sectors 88 (labeled individually 88$a$ to 88$x$), wherein the sectors 88 are writeable blocks of memory. The old binary image 12 is stored in a range of the sectors 88 in flash memory 86. In accordance with the method 300 described in connection with FIG. 8, the patch manager 92 employs the forward patch 20 to incrementally generate the data for the new binary image 14 and overwrite the old binary image data on a sector-by-sector basis, relying in each iteration upon the then-prevailing partially patched image 30 in flash memory 86 as the basis for generating the next sector of new binary image data.

Reverse Incremental Patch

In embodiments where a forward patch is an incremental forward patch, the present application provides a method and system for generating an incremental reverse patch. The incremental reverse patch is generated as described above, with the indexing operation being performed at a host or server level to generate index files and the patch generation operation being performed at the device level after distribution of the index file(s) with the forward patch.

Figure 9A:
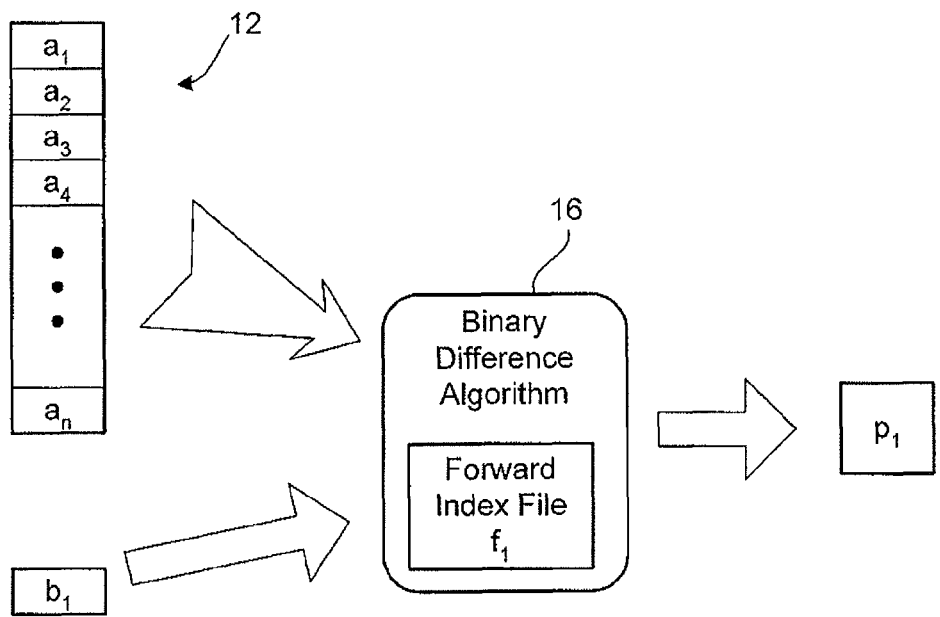
FIGS. 9A and 9B diagrammatically show the generation of incremental reverse index files for an incremental reverse patch.
Figure 9A:
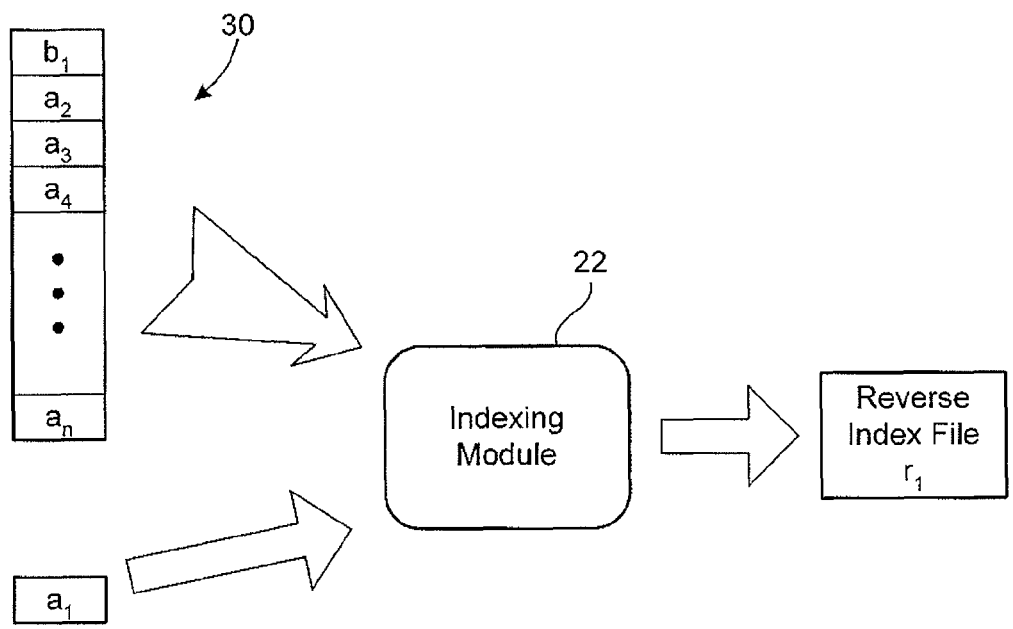
Figure 9B:
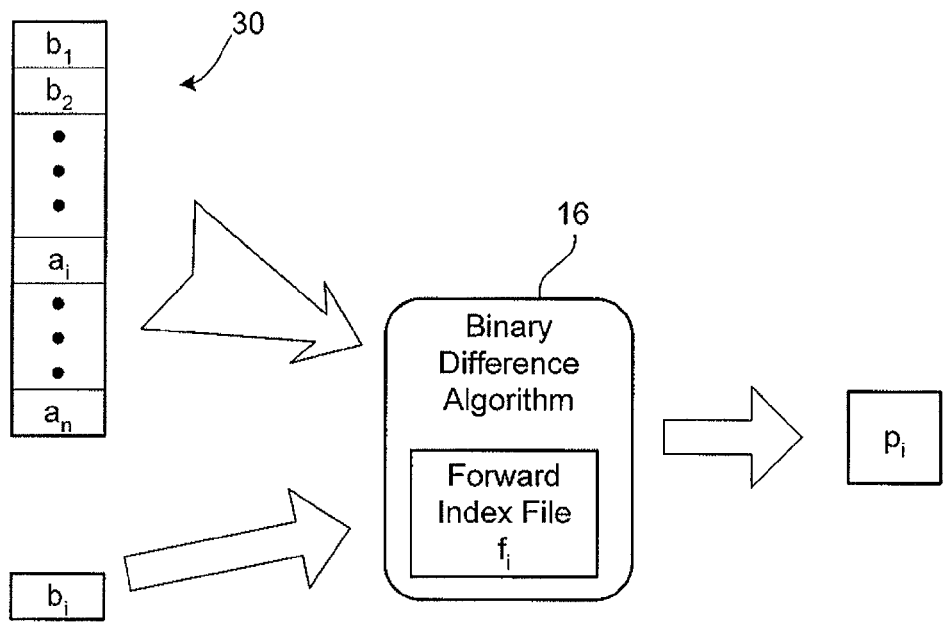
Figure 9B:
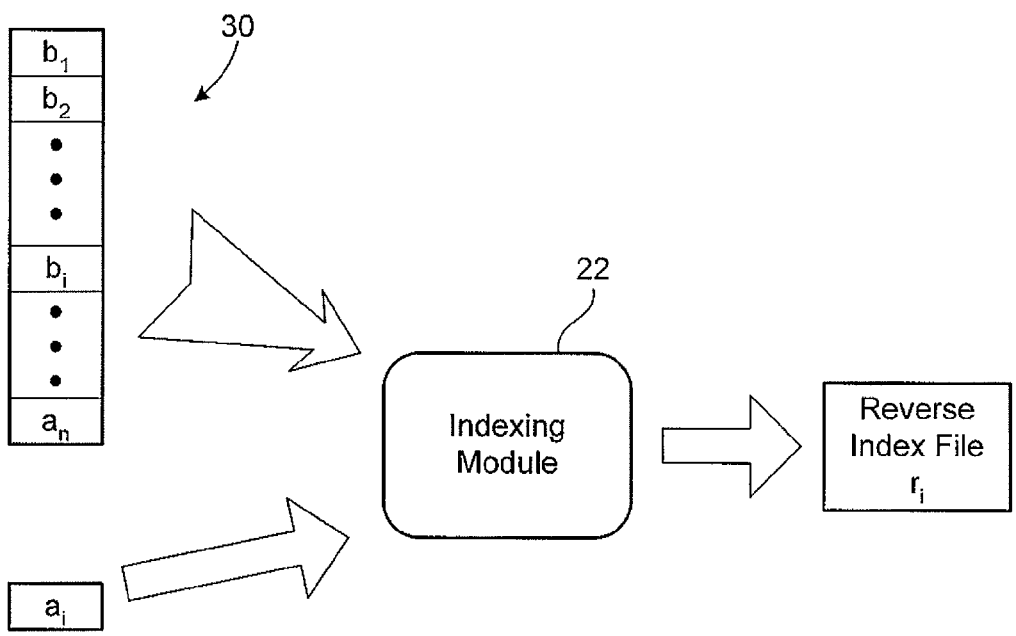

Reference is now made to FIGS. 9A and 9B, which diagrammatically illustrate the generation of incremental reverse index files for an incremental reverse patch, in accordance with one embodiment of the present application.

FIG. 9A illustrates the generation of a first reverse index file $r_1$. As described previously in connection with FIG. 5A, the host 70 (FIG. 3) generates a first patch $p_1$, using the binary difference algorithm 16. The first patch $p_i$ contains the instructions and data for generating the first sector $b_1$ of the new binary image 14 based upon the old binary image 12. After generating the first patch $p_1$, the partially patched image 30 is updated so as to include the first sector $b_1$ of the new binary image 14. However, prior to updating the partially patched image 30 by overwriting the first sector $a_1$ of the old binary image 12, the host 70 (FIG. 3) makes a copy of the first sector $a_1$ of the old binary image 12.

Using the indexing module 22, the host 70 (FIG. 3) then generates the reverse index file $r_1$ from the partially patched image 30 and the first sector $a_1$ of the old binary image 12. The reverse index file $r_1$ identifies the regions of similarity between the partially patched image 30 and the first sector $a_1$ of the old binary image 12. It will be appreciated that the reverse index file $r_1$ will later be used to create a reverse patch for generating the first sector $a_1$ from the partially patched image 30.

As illustrated in FIG. 9B, the process of generating the incremental forward patches $p_i$ from the sectors $b_i$ of the new binary image 14 and the then-current partially patched image 30 continues through all sectors of the new binary image 14.

At each iteration, a reverse index file $r_i$ is generated that identifies the regions of similarity between the overwritten sector $a_i$ of the old binary image 12 and the then-current partially patched image 30.

Once all the sector-specific forward patches $p_i$ have been generated and all the sector-specific reverse index files $r_i$ have been generated, the host 70 (FIG. 3) then distributes the incremental patch $(p_1\text{-}p_n)$ together with the set of reverse index files $(r_1\text{-}r_n)$. The incremental patch $(p_1\text{-}p_n)$ and the set of reverse index files $(r_1\text{-}r_n)$ may be packaged together as a deliverable 96 (FIG. 3) and transmitted to one or more remote client devices through one or more networks. The remote client devices may include mobile electronic devices.

Figure 10:
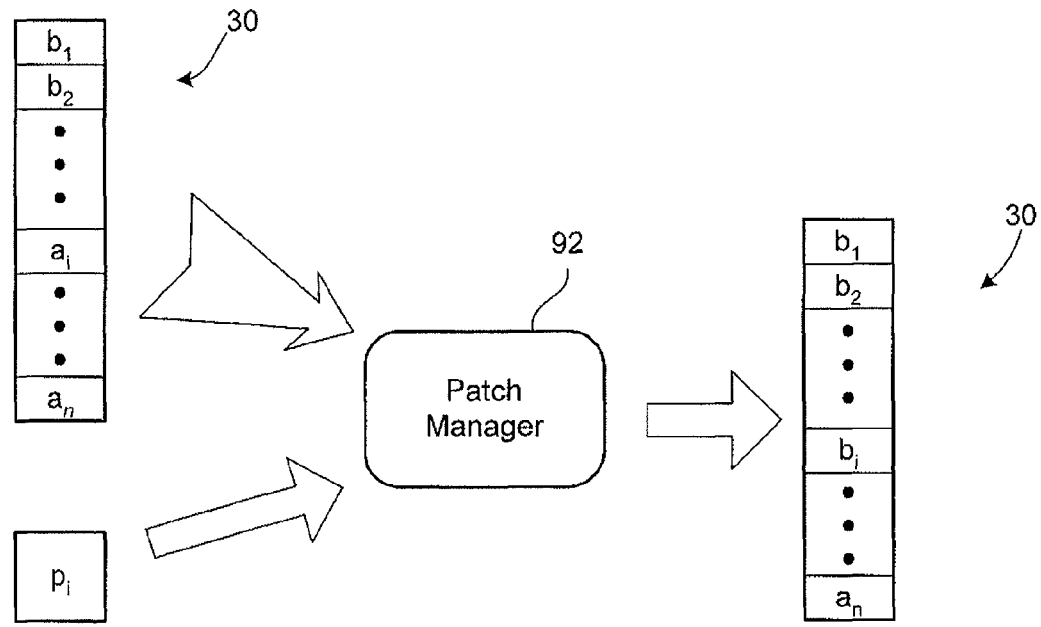
FIG. 10 diagrammatically shows the generation of an incremental reverse patch during application of an incremental patch at a client device.
Figure 10:
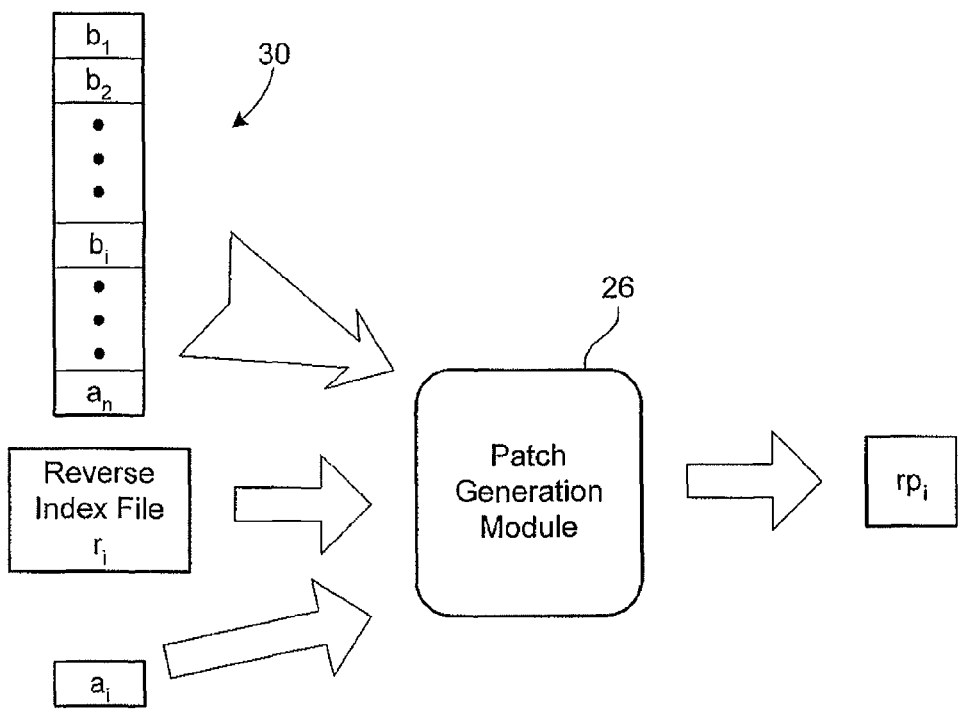

Reference is now made to FIG. 10, which diagrammatically shows the generation of an incremental reverse patch during application of an incremental patch at a client device.

At the client device, the incremental patch $(p_1\text{-}p_n)$ is applied on a sector-by-sector basis. As illustrated in FIG. 10, in one embodiment, the sector-specific patches (i.e. delta files) $(p_1\text{-}p_n)$ may be applied in sequence from $p_i$ to $p_n$, for generating sectors $b_1$ to $b_n$. The application of patch $p_i$ to the then-current partially patched image 30 results in generation of new sector $b_i$. Before overwriting old sector $a_i$ with new sector $b_i$, the client device saves old sector $a_i$ in memory so as to use it for generating the incremental reverse patch.

The client device generates the sector-specific reverse patches $rp_i$ using the patch generation module 26. Each sector-specific reverse patch $rp_i$ contains commands for generating one of the old sectors $a_i$ from one of the then-current partially patched images 30. To generate one of the reverse patches $rp_i$, the patch generation module 26 uses the old sector $a_i$, the then-current partially patched image 30 containing new sector $b_i$, and the reverse index file $r_i$. The reverse index file $r_i$ identifies the regions of similarity between old sector $a_i$ and the then-current partially patched image 30.

Figure 11:
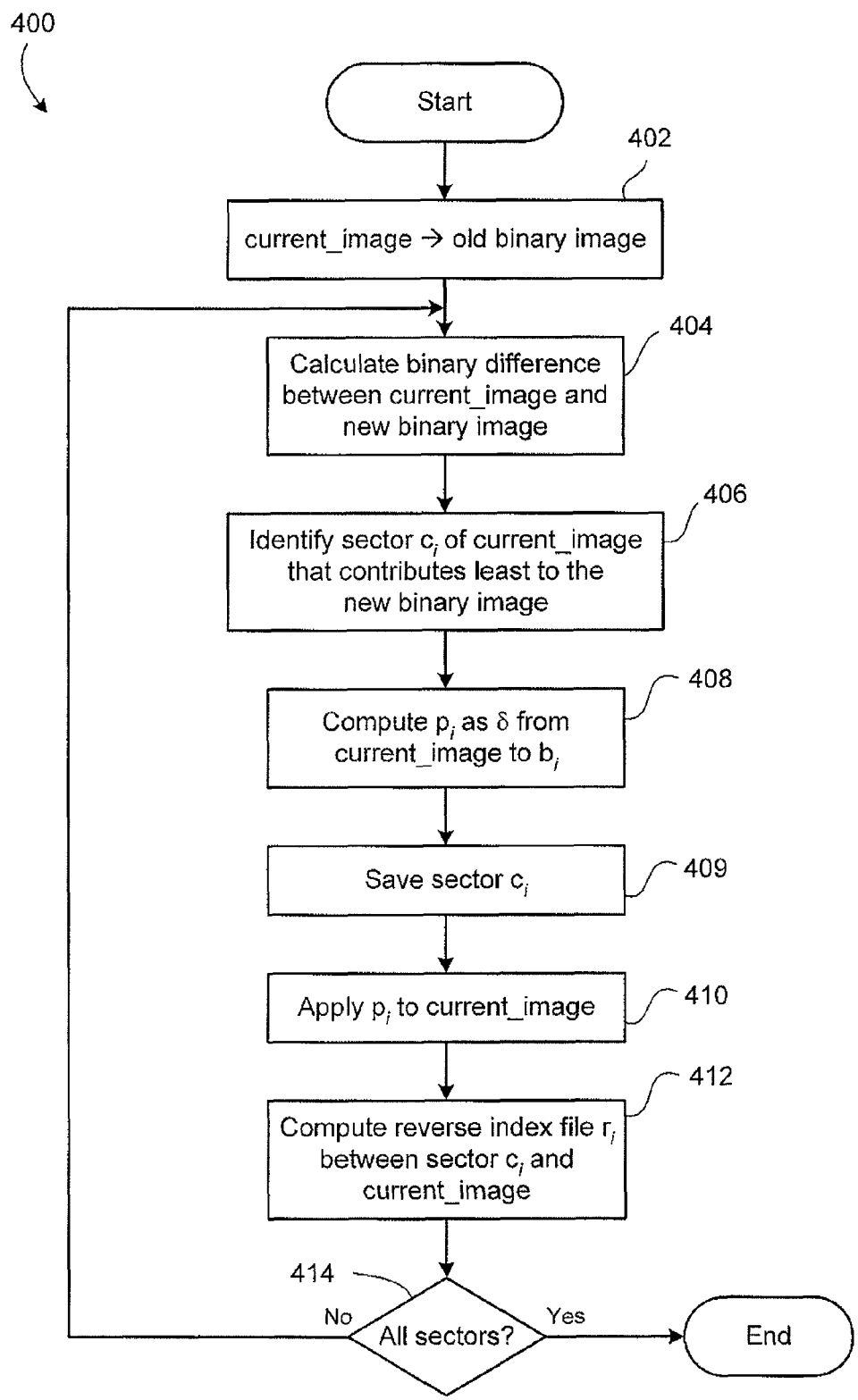
FIG. 11 shows, in flowchart form, an embodiment of a method for generating reverse index files for creating a reverse patch.

Reference is now made to FIG. 11, which shows, in flowchart form, an embodiment of a method 400 for generating reverse index files for creating a reverse patch. The method 400 is similar to the method 200 (FIG. 7) in that it describes the steps for creating an incremental forward patch in a "least damage" order. The method 400 differs in that it also includes steps for creating the reverse index files that correspond to the sector-specific delta files $p_i$ that make up the incremental forward patch.

The method 400 begins in step 402, wherein the old binary image 12 in memory is designated as the current image, as indicated by the label current_image. In step 404, the binary difference between the current_image and the new binary image is determined, and the results are used in step 406 to identify the sector $c_i$ of current_image that contributes least to the new binary image. In other words, in step 406, the sector $c_i$ is identified on the basis that, when it is overwritten, the least amount of similar data will be lost.

Having identified the sector $c_i$, in step 408 the delta file $p_i$ is generated. The delta file $p_i$ (i.e. sector-specific forward patch $p_i$) contains the commands and data for generating new sector $b_i$ from the current_image. In step 409, sector $c_i$ of the current_image is saved. The sector $c_i$ may be saved in RAM, in flash memory, or in any other suitable memory. Then in step 410, sector $c_i$ is overwritten with new sector $b_i$. In other words, in step 410 the delta file $p_i$ is applied to the current_image.

In step 412, the reverse index file $r_i$ is computed. The reverse index file $r_i$ identifies the regions of similarity between the current_image (including new sector $b_i$) and saved sector $c_i$. As described previously, the computation of the reverse index file $r_i$ may be performed using suffix sorting, hashing, or any other suitable algorithm for identifying regions of similarity between two binary images.

In step 414 of the method 400, the host 70 (FIG. 3) determines whether all of the sector-specific delta files $p_i$ and their corresponding reverse index files $r_i$ have been generated. If not, then the method 400 loops back to step 404 to identify the next sector. If so, then the method 400 ends. Following the method 400, the host 70 (FIG. 3) may package the collection of delta files $(p_1\text{-}p_n)$, i.e. the incremental forward patch, together with the set of reverse index files $(r_1\text{-}r_n)$ as a deliverable 96 (FIG. 3). The deliverable 96 may then be distributed to client devices.

Figure 12:
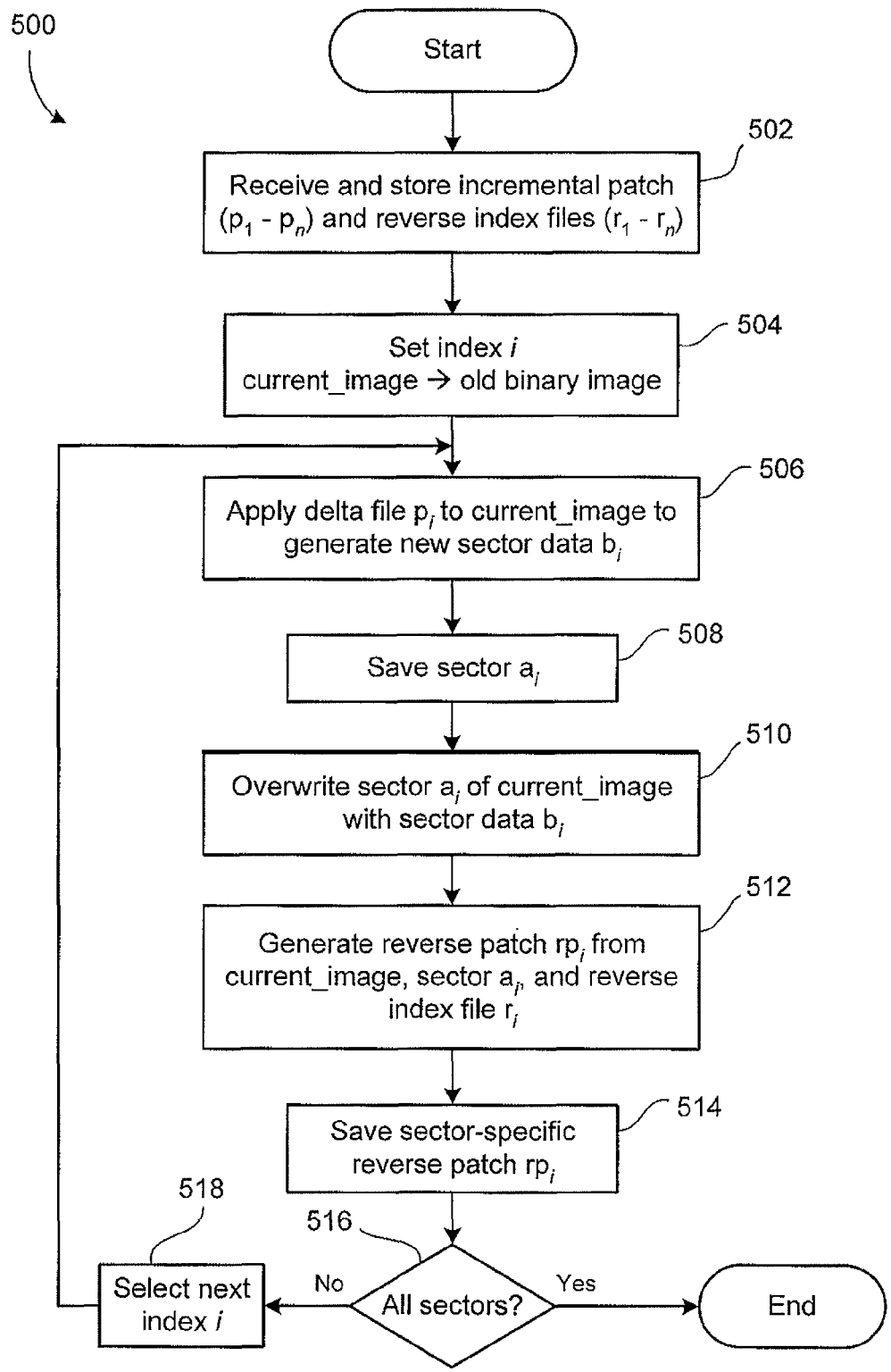
FIG. 12 shows, in flowchart form, a method of generating an incremental reverse patch on a client device.

Referring now to FIG. 12, there is shown, in flowchart form, a method 500 of generating an incremental reverse patch on a client device. The method 500 begins in step 502 with the reception and storage of the incremental forward patch $(p_1\text{-}p_n)$ and the set of reverse index files $(r_1\text{-}r_n)$.

In step 504, the index i is set to a starting value. The starting value may be specified by the incremental patch. In an embodiment where the patch is intended to be applied sequentially beginning with the first sector of the image and proceeding to the nth sector, the index i may initially be set to 1. However, as noted above, the forward patch may be intended to be applied to sectors in other orders. The incremental forward patch may specify an indexing pattern that indicates the order in which the sectors are to be updated using the patch. Accordingly, the indexing pattern may indicate the starting value for the index i.

The label current_image refers to the state of the binary image, e.g. in flash memory, that is being updated by way of the incremental forward patch. The current_image may also be referred to as the partially patched image. In step 504, the current_image is the old binary image.

In step 506, delta file $p_i$ is used to generate new sector $b_i$ from the current_image. In step 508, sector $a_i$ within the current_image is saved elsewhere in memory. In some embodiments, sector $a_i$ may be saved in RAM, in flash memory, or in other suitable memory on the client device. Sector $a_i$ within the current_image is then overwritten in step 510 with new sector $b_i$, to create the updated current_image.

In step 512, the client device then generates sector-specific reverse patch $rp_i$ from the current_image, the saved sector $a_i$, and reverse index file $r_i$. Reverse index file $r_i$ describes the regions of similarity between saved sector $a_i$ and the current_image. The sector-specific reverse patch $rp_i$ is then saved to memory in step 514. In many embodiments, the sector-specific reverse patch $rp_i$ is saved to non-volatile memory, such as flash memory.

In step 516, the client device determines whether the incremental patching operation is complete, i.e. whether all the new sectors $b_1$ to $b_n$ have been generated. If not, then the method 500 continues to step 518, wherein the next index i is selected. As described above, this step may, in some embodiments, include incrementing the index i. In some other embodiments, this step may include setting index i to an integer prescribed by an indexing pattern, as discussed above. Following step 518, the method 500 loops back to step 506 to continue application of the incremental forward patch and generation of the incremental reverse patch.

If all sectors have been completed, then following step 516 the method 500 ends. At this point, the full incremental reverse patch $(rp_1$ to $rp_n)$ has been generated and saved in memory. Accordingly, should the user determine at some point in the future that he or she wishes to undo or roll back the forward patch, then the incremental reverse patch is available to recover the old binary image.

The present application describes various software components, modules, object, programs or other machine-readable code elements, and the execution of those software components by a suitable processor. The programming of such software components will be within the understanding of a person of ordinary skill in the art having regard to the detailed description herein.

Certain adaptations and modifications of the described embodiments can be made. Therefore, the above discussed embodiments are considered to be illustrative and not restrictive.

The invention claimed is:

1. A method of generating an index file for use in reversing a forward patch on an electronic device, wherein the forward patch generates a new binary image from an old binary image, the method comprising:
   generating, at a processor, the index file, the index file identifying regions of similarity between the old binary image and the new binary image for use in obtaining at least a portion of the old binary image from the new binary image; and
   transmitting, from a communications interface, the forward patch and the index file to the electronic device.

2. The method of claim 1, further comprising:
   applying the forward patch to the old binary image to create the new binary image at the electronic device; and
   generating the reverse patch from the new binary image, the old binary image, and the index file at the electronic device.

3. The method of claim 2, further comprising generating the forward patch.

4. The method of claim 3, wherein the new binary image occupies a plurality of sectors, and wherein generating the forward patch and generating the index file include:
   setting a current image as the old binary image,
   selecting one of the plurality of sectors from the new binary image,
   determining binary difference algorithm to generate delta file for obtaining said one of the plurality of sectors from the current image,
   overwriting an old sector within the current image with said one of the plurality of sectors, while retaining a copy of the old sector,
   generating a sector-specific index file, wherein the sector-specific index file identifies regions of similarity between said old sector and said current image, and
   repeating the selecting, determining, overwriting, and generating once for each of the plurality of sectors,
   wherein the forward patch thereby comprises a plurality of delta files, and
   wherein the index file comprises a plurality of sector-specific index files.

5. The method of claim 4, wherein applying the forward patch and generating the reverse patch include:
   setting a current image as the old binary image,
   selecting one of the plurality of sectors from the new binary image,
   applying one of said plurality of delta files to the current image to generate said one of the plurality of sectors,
   overwriting an old sector within the current image with said one of the plurality of sectors while retaining a copy of the old sector,
   generating a sector-specific reverse patch from the current image, the old sector, and one of the sector-specific index files, and
   repeating the selecting, applying, overwriting, and generating once for each of the plurality of sectors,
   and wherein the reverse patch comprises a plurality of said sector-specific reverse patches.

6. The method of claim 1, wherein said generating the index file includes performing an indexing operation, and wherein said indexing operation includes hashing or suffix sorting.

7. The method of claim 1, wherein said transmitting includes packaging said forward patch and said index file together as a deliverable, and transmitting said deliverable over one or more communications networks.

8. The method of claim 7, wherein said electronic device comprises a mobile wireless device, and wherein said communications networks include a wireless network.

9. The method of claim 1, further including storing said reverse patch in non-volatile memory on said device.

10. A method of generating a reverse patch for reversing a forward patch on an electronic device, wherein the forward patch generates a new binary image from an old binary image, the method comprising:
    receiving, using a communications subsystem, the forward patch and an index file, the index file identifying regions of similarity between the old binary image and the new binary image for use in obtaining at least a portion of the old binary image from the new binary image;
    applying, at a processor executing a patch manager, the forward patch to the old binary image to create the new binary image at the electronic device; and
    generating, at said processor executing a patch generation module, the reverse patch from the new binary image, the old binary image, and the index file at the electronic device.

11. The method of claim 10, wherein the new binary image occupies a plurality of sectors, wherein the forward patch comprises a plurality of sector-specific delta files each for obtaining one of said plurality of sectors, wherein the index file comprises a plurality of sector-specific index files, and wherein applying the forward patch and generating the reverse patch include:
    setting a current image as the old binary image,
    selecting one of the plurality of sectors from the new binary image,
    applying one of said plurality of sector-specific delta files to the current image to generate said one of the plurality of sectors,
    overwriting an old sector within the current image with said one of the plurality of sectors while retaining a copy of the old sector,
    generating a sector-specific reverse patch from the current image, the old sector, and one of the sector-specific index files, wherein said sector-specific index file identifies regions of similarity between said old sector and said current image, and
    repeating the selecting, applying, overwriting, and generating once for each of the plurality of sectors,
    and wherein the reverse patch comprises a plurality of said sector-specific reverse patches.

12. The method of claim 10, wherein said receiving includes receiving the forward patch and the index file over a communications network and storing the forward patch and the index file in memory on the electronic device.

13. The method of claim 12, wherein said electronic device comprises a mobile wireless device, and wherein said communications network includes a wireless network.

14. The method of claim 12, further comprising storing said reverse patch in non-volatile memory on said electronic device.

15. A system for generating a reverse patch for reversing a forward patch, wherein the forward patch generates a new binary image from an old binary image, the system comprising:

a server having a processor and memory for storing the new binary image and the old binary image, and for storing the forward patch, and having a indexing module executable by the processor for generating an index file, the index file identifying regions of similarity between the old binary image and the new binary image for use in obtaining at least a portion of the old binary image from the new binary image, the server including a communications interface for transmitting the forward patch and the index file from the server to the electronic device; and an electronic device having a device processor and device memory for storing the forward patch and the index file received from the server via one or more communications networks, the electronic device including a patch manager for applying the forward patch to the old binary image to create the new binary image, and including a patch generation module for generating the reverse patch from the new binary image, the old binary image, and the index file.

16. The system of claim 15, wherein said server further includes a binary difference algorithm for generating said forward patch.

17. The system of claim 16, wherein the new binary image occupies a plurality of sectors, and wherein said binary difference algorithm and said indexing module include:

a component for setting a current image as the old binary image, a component for selecting one of the plurality of sectors from the new binary image, a component for determining a binary difference algorithm to generate a delta file for obtaining said one of the plurality of sectors from the current image, a component for overwriting an old sector within the current image with said one of the plurality of sectors, while retaining a copy of the old sector, and a component generating a sector-specific index file, wherein the sector-specific index file identifies regions of similarity between said old sector and said current image, and wherein said components for selecting, determining, overwriting, and generating are configured to operate once for each of the plurality of sectors, and wherein the forward patch comprises a plurality of delta files created by the component for determining, and wherein the index file comprises a plurality of sector-specific index files created by the component for generating.

18. The system of claim 17, wherein said patch manager and said patch generation module include:

a component for setting a current image as the old binary image, a component for selecting one of the plurality of sectors from the new binary image, a component for applying one of said plurality of delta files to the current image to generate said one of the plurality of sectors, a component for overwriting an old sector within the current image with said one of the plurality of sectors while retaining a copy of the old sector, and a component for generating a sector-specific reverse patch from the current image, the old sector, and one of the sector-specific index files, and wherein said components for selecting, applying, overwriting, and generating are configured to operate once for each of the plurality of sectors, and wherein the reverse patch comprises a plurality of said sector-specific reverse patches.

19. The system of claim 15, wherein said indexing module for generating the index file includes an indexing operator, which includes hashing or suffix sorting.

20. The system of claim 15, wherein said electronic device comprises a mobile wireless device, and further including a wireless network over which said server transmits the forward patch and the index file to the mobile wireless device.

21. The system of claim 15, wherein said electronic device includes non-volatile memory for storing said reverse patch.

22. A server configured to generate an index file for use in generating a reverse patch for reversing a forward patch on an electronic device, wherein the forward patch generates a new binary image from an old binary image, the server comprising:

a processor;

memory for storing the new binary image and the old binary image, and for storing the forward patch;

a indexing module executable by the processor for generating an index file, the index file identifying regions of similarity between the old binary image and the new binary image for use in obtaining at least a portion of the old binary image from the new binary image; and a communications interface for transmitting the forward patch and the index file from the server to the electronic device.

23. The server of claim 22, further including a binary difference algorithm for generating the forward patch.

24. The server of claim 23, wherein the new binary image occupies a plurality of sectors, and said binary difference algorithm and said indexing module include:

a component for setting a current image as the old binary image, a component for selecting one of the plurality of sectors from the new binary image, a component for determining a binary difference algorithm to generate a delta file for obtaining said one of the plurality of sectors from the current image, a component for overwriting an old sector within the current image with said one of the plurality of sectors, while retaining a copy of the old sector, and a component for generating a sector-specific index file, wherein the sector-specific index file identifies regions of similarity between said old sector and said current image, and wherein said components for selecting, determining, overwriting, and generating are configured to operate once for each of the plurality of sectors, and wherein the forward patch comprises a plurality of delta files created by the component for determining, and wherein the index file comprises a plurality of sector-specific index files created by the component for generating.

25. The server of claim 22, wherein said indexing module includes a component for hashing or a component for suffix sorting.

26. The server of claim 22, wherein said communications interface includes a component for packaging said forward patch and said index file together as a deliverable, and transmitting said deliverable over one or more communications networks.

27. An electronic device configured to generate a reverse patch for reversing a forward patch, wherein the forward patch generates a new binary image from an old binary image, the electronic device comprising:
- a device processor;
- a communications subsystem for receiving the forward patch and the index file from a server via one or more communications networks;
- device memory for storing the forward patch and the index file;
- a patch manager for applying the forward patch to the old binary image to create the new binary image;
- a patch generation module for generating the reverse patch from the new binary image, the old binary image, and the index file.

28. The electronic device of claim 27, wherein the new binary image occupies a plurality of sectors, the forward patch comprises a plurality of sector-specific delta files each for obtaining one of said plurality of sectors, the index file comprises a plurality of sector-specific index files, and wherein the patch manager and the patch generation module include:
- a component for setting a current image as the old binary image,
- a component for selecting one of the plurality of sectors from the new binary image,
- a component for applying one of said plurality of sector-specific delta files to the current image to generate said one of the plurality of sectors,
- a component for overwriting an old sector within the current image with said one of the plurality of sectors while retaining a copy of the old sector, and
- a component for generating a sector-specific reverse patch from the current image, the old sector, and one of the sector-specific index files, wherein said sector-specific index file identifies regions of similarity between said old sector and said current image, and wherein said components for selecting, applying, overwriting, and generating are configured to operate once for each of the plurality of sectors, and wherein the reverse patch comprises a plurality of said sector-specific reverse patches.

29. The electronic device of claim 28, wherein said electronic device comprises a mobile wireless device, and wherein said one or more communications networks include a wireless network.

30. The electronic device of claim 27, further including non-volatile memory for storing said reverse patch.

31. A non-transitory computer program product comprising a computer readable medium having encoded thereon computer-executable instructions for configuring a processor to generate an index file for use in generating a reverse patch for reversing a forward patch on an electronic device, wherein the forward patch generates a new binary image from an old binary image, the computer executable instructions comprising:
- instructions for generating the index file, the index file identifying regions of similarity between the old binary image and the new binary image for use in obtaining at least a portion of the old binary image from the new binary image; and
- instructions for transmitting the forward patch and the index file to the electronic device.

32. A non-transitory computer program product comprising a computer readable medium having encoded thereon computer-executable instructions for configuring a processor to generate a reverse patch for reversing a forward patch on an electronic device, wherein the forward patch generates a new binary image from an old binary image, the computer executable instructions comprising:
- instructions for receiving the forward patch and an index file, the index file identifying regions of similarity between the old binary image and the new binary image for use in obtaining at least a portion of the old binary image from the new binary image;
- instructions for applying the forward patch to the old binary image to create the new binary image at the electronic device; and
- instructions for generating the reverse patch from the new binary image, the old binary image, and the index file at the electronic device.

* * * * *